(12) United States Patent
Xu et al.

(10) Patent No.: US 11,855,784 B2
(45) Date of Patent: Dec. 26, 2023

(54) HYBRID AUTOMATIC REPEAT REQUEST (HARQ) ENHANCEMENT FOR DORMANCY-INDICATING DOWNLINK CONTROL INFORMATION (DCI)

(71) Applicant: QUALCOMM Incorporated, San Diego, CA (US)

(72) Inventors: Huilin Xu, Temecula, CA (US); Changhwan Park, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 192 days.

(21) Appl. No.: 17/398,361

(22) Filed: Aug. 10, 2021

(65) Prior Publication Data
US 2022/0052794 A1 Feb. 17, 2022

Related U.S. Application Data

(60) Provisional application No. 63/064,331, filed on Aug. 11, 2020.

(51) Int. Cl.
*H04W 72/04* (2023.01)
*H04L 1/1812* (2023.01)
(Continued)

(52) U.S. Cl.
CPC .......... *H04L 1/1819* (2013.01); *H04L 1/1896* (2013.01); *H04W 72/1273* (2013.01); *H04W 72/23* (2023.01)

(58) Field of Classification Search
CPC ... H04L 1/1819; H04L 1/1896; H04L 1/1861; H04L 1/1671; H04L 5/0007; H04L 5/001;
(Continued)

(56) References Cited

U.S. PATENT DOCUMENTS 8,767,654 B2 * 7/2014 Terry .................... H04L 1/1838
370/310
2015/0327220 A1 * 11/2015 Pan ........................ H04W 72/23
370/329

(Continued)

OTHER PUBLICATIONS

NPL, ZTE, R1-1910109 Discussion on low latency SCell activation, 3GPP TSG RAN WG1 Meeting #98bis, Chongqing, China, Aug. 14-20, 2019 (Year: 2019).*

(Continued)

*Primary Examiner* — Mahbubul Bar Chowdhury
(74) *Attorney, Agent, or Firm* — Shumaker & Sieffert, PA

(57) ABSTRACT

Aspects of the disclosure relate to devices and methods for managing carrier aggregation. Downlink control information (DCI), transmitted via a primary cell (PCell), may include one or more secondary cell (SCell) dormancy indication (SDI) value(s) for one or more secondary cells (SCells). That DCI may also schedule a physical downlink shared channel. A scheduled entity may transmit acknowledgment information indicating whether the scheduled entity successfully received the DCI. Where the SDI indicates a switch in behavior relative to one or more SCell(s) and the acknowledgment information indicates that the scheduled entity successfully received that DCI, the one or more SCell(s) transition from dormant to active or vice-versa. Accordingly, the scheduled entity conforms its behavior to provide the appropriate dormancy and non-dormancy behavior when utilizing, in addition to the PCell, one or more SCell(s) for wireless communication in carrier aggregation.

29 Claims, 12 Drawing Sheets

(51) Int. Cl.
*H04W 72/1273* (2023.01)
*H04L 1/1867* (2023.01)
*H04W 72/23* (2023.01)

(58) Field of Classification Search
CPC ... H04L 5/0053; H04L 5/0055; H04L 5/0094; H04L 5/0098; H04W 72/1273; H04W 72/23; H04W 52/0232; Y02D 30/70
See application file for complete search history.

(56) References Cited

U.S. PATENT DOCUMENTS

| | | | |
|---|---|---|---|
| 2016/0242154 A1* | 8/2016 | Lee | H04W 72/04 |
| 2018/0279287 A1* | 9/2018 | John Wilson | H04B 7/088 |
| 2021/0029772 A1* | 1/2021 | Islam | H04W 72/23 |
| 2022/0303979 A1* | 9/2022 | Li | H04L 1/1864 |
| 2022/0394548 A1* | 12/2022 | Huang | H04W 28/06 |
| 2022/0400434 A1* | 12/2022 | Seo | H04W 72/23 |
| 2022/0408515 A1* | 12/2022 | Li | H04W 52/0229 |

OTHER PUBLICATIONS

NPL, Huawei, R4-2001631 Discussion on RRM requirements for SCell dormancy, 3GPP TSG-RAN WG4 Meeting #94-e, Online, Feb. 24-Mar. 6, 2020. (Year: 2020).*

NPL, LG Electronics, R1-1910838 Discussion on L1 based Scell dormancy, 3GPP TSG RAN WG1 Meeting #98bis, Chongqing, China, Oct. 14-20, 2019. (Year: 2019).*

* cited by examiner

HYBRID AUTOMATIC REPEAT REQUEST (HARQ) ENHANCEMENT FOR DORMANCY-INDICATING DOWNLINK CONTROL INFORMATION (DCI)

PRIORITY CLAIM

This application claims priority to and the benefit of Provisional Patent Application No. 63/064,331, filed in the United States Patent and Trademark Office (USPTO) on Aug. 11, 2020, the entire content of which is incorporated herein by reference as if fully set forth below in its entirety and for all applicable purposes.

TECHNICAL FIELD

The technology discussed below relates generally to wireless communication systems, and more particularly, to wireless communication systems capable of dynamic carrier aggregation. Some aspects may include enabling and providing communication devices and methods configured to provide and enable techniques for carrier aggregation involving multiple carriers (e.g., serving cells) when a scheduled device uses power-saving techniques.

INTRODUCTION

Carrier aggregation allows a device to communicate over multiple serving cells (e.g., carriers), for example, for improved bandwidth, reliability, among other achieved advantages. A user equipment (UE), such as a smartphone or other networked device, may employ carrier aggregation techniques involving multiple carriers to facilitate wireless communication with a primary cell (PCell) as a special serving cell and then variously with one or more secondary cells (SCells), as well.

Power sensitive devices, such as a UE for example, may be unable to communicate utilizing a large number of SCells for any prolonged period of time due to the UE, in most cases, having limited resources, including power resources, processing resources, memory resources, and so forth. Accordingly, a UE operating in a wireless network may coordinate wireless exchange efforts with the network to achieve optimal performance while conserving resources when possible.

As the demand for mobile broadband access continues to increase, research and development continue to advance wireless communication technologies not only to meet the growing demand for mobile broadband access, but to advance and enhance the user experience with mobile communications.

BRIEF SUMMARY OF SOME EXAMPLES

The following presents a simplified summary of one or more aspects of the present disclosure, to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description presented later.

Aspects of the disclosure relate to managing carrier aggregation, where a wireless device communicates with a network over multiple carriers (e.g., component carriers or CCs), corresponding to multiple cells. For example, a set of cells in carrier aggregation may include a primary cell and one or more secondary cells. Downlink control information (DCI) transmitted by a primary cell (PCell) includes secondary cell dormancy indication (SDI) information for one or more secondary cells (SCells), and in some examples, also includes a scheduling grant for a physical downlink shared channel (PDSCH) for the PCell. In response, a wireless device transmits feedback information indicating, in part, whether it received the DCI successfully. If the SDI information indicates that a dormant connection between the wireless device and a secondary cell (SCell) should be placed into an active mode ("woken up"), and the feedback information indicates that the wireless device successfully received the DCI, the SCell connection may be transitioned from a dormant mode to an active mode (e.g., "woken up").

In one aspect, the present disclosure provides a method of wireless communication. The method of wireless communication includes: receiving, via a primary cell (PCell), a first downlink control information (DCI) message, the first DCI message including a secondary cell dormancy indication (SDI) that indicates a user equipment (UE) behavior corresponding to one or more secondary cells (SCells); transmitting, via the PCell, first DCI-acknowledgment (DCI-ACK) information acknowledging reception of at least the first DCI message; and utilizing, in accordance with the UE behavior, the one or more SCells and the PCell to receive a set of downlink (DL) transmissions subsequent to the transmitting of the first DCI-ACK information.

In another aspect, a wireless communication device is provided. The wireless communication device includes: a processor; a transceiver communicatively coupled to the processor; and a memory communicatively coupled to the processor. The processor and the memory are configured to: receive, via a primary cell (PCell), a first downlink control information (DCI) message including a secondary cell dormancy indication (SDI), the SDI indicating a user equipment (UE) behavior corresponding to a secondary cell (SCell); transmit, via the PCell, first DCI-acknowledgment (DCI-ACK) information comprising one or more bits indicating whether the wireless communication device successfully received the first DCI message; and utilize, in accordance with the UE behavior, the SCell and the PCell to receive a set of downlink (DL) transmissions subsequent to the transmitting of the first DCI-ACK information.

In another aspect, the present disclosure provides a method of wireless communication. The method of wireless communication includes: transmitting, by a scheduling entity via a primary cell (PCell), a first downlink control information (DCI) message including a secondary cell dormancy indication (SDI), the SDI indicating a user equipment behavior (e.g., an activity mode) of a secondary cell (SCell); receiving, from a scheduled entity via the PCell, first DCI-acknowledgment (DCI-ACK) information that includes one or more bits indicating whether the first DCI message was successfully received by the scheduled entity; and communicating with the scheduled entity via the SCell according to the desired activity mode.

In a further aspect, a wireless communication device is disclosed. The wireless communication device (e.g., a scheduling entity) includes a processor; a transceiver communicatively coupled to the processor; and a memory communicatively coupled to the processor, wherein the processor and the memory are configured to: transmit, to a scheduled entity via a primary cell (PCell), a first downlink control information (DCI) message including a secondary cell dormancy indication (SDI), the SDI indicating an activity mode corresponding to a secondary cell (SCell); receive, from the scheduled entity via the PCell, first DCI-acknowledgment (DCI-ACK) information that includes one or more bits indicating whether the scheduled entity successfully received the first DCI message; and communicate with the scheduled entity via the SCell according to the desired activity mode.

In another aspect, the present disclosure provides a method of wireless communication. The method includes receiving, by a scheduled entity via a primary cell (PCell) from a scheduling entity, first downlink control information (DCI) including a secondary cell dormancy indication (SDI), the SDI indicating a desired activity mode of a secondary cell (SCell) with respect to the scheduled entity; transmitting, from the scheduled entity to the scheduling entity via the PCell, first DCI-acknowledgment (DCI-ACK) information that includes one or more bits indicating whether the first DCI message was successfully received by the scheduled entity; and configuring the scheduled entity to communicate with the SCell according to the desired activity mode.

In another aspect, a wireless communication device is provided. The device comprises a processor; a transceiver communicatively coupled to the processor; and a memory communicatively coupled to the processor. The processor and the memory are configured to receive, from a scheduling entity via a primary cell (PCell), first downlink control information (DCI). The first DCI message includes a secondary cell dormancy indication (SDI) and the SDI indicating a desired activity mode of a secondary cell (SCell) with respect to the device. The processor and the memory are further configured to transmit, to the scheduling entity via the primary cell, first DCI-acknowledgment (DCI-ACK) information. The first DCI-ACK information includes one or more bits indicating whether the first DCI message was successfully received by the device. The processor and the memory are further configured to configure the device to communicate with the SCell according to the desired activity mode.

In another aspect, a wireless communication device includes means for receiving, via a primary cell (PCell) from a scheduling entity, first downlink control information (DCI) including a secondary cell dormancy indication (SDI). The SDI indicates a desired activity mode of a secondary cell (SCell) with respect to the device. The device further includes means for transmitting, to the scheduling entity via the primary cell, first DCI-acknowledgment (DCI-ACK) information. The first DCI-ACK information includes one or more bits indicating whether the first DCI message was successfully received by the device. The device further includes means for configuring the device to communicate with the SCell according to the desired activity mode.

In a further aspect, the present disclosure provides a non-transitory computer-readable medium storing computer-executable code. The computer-executable code includes code for causing a wireless communication device to receive, from a scheduling entity via a primary cell (PCell), first downlink control information (DCI). The first DCI message includes a secondary cell dormancy indication (SDI). The SDI indicates a desired activity mode of a secondary cell (SCell) with respect to the device. The computer-executable code further includes code for causing the wireless communication device to transmit, to the scheduling entity via the PCell, first DCI-acknowledgment (DCI-ACK) information. The first DCI-ACK information includes one or more bits indicating whether the first DCI message was successfully received by the device. The computer-executable code further includes code for causing the wireless communication device to configure the device to communicate with the SCell according to the desired activity mode.

In another aspect, a method of wireless communication includes transmitting, by a scheduling entity to a scheduled entity via a primary cell (PCell), a first downlink control information (DCI) message including a secondary cell dormancy indication (SDI), the SDI indicating a desired activity mode of a secondary cell (SCell) with respect to the scheduled entity; receiving, by the scheduling entity from the scheduled entity via the PCell, first DCI-acknowledgment (DCI-ACK) information that includes one or more bits indicating whether the first DCI message was successfully received by the scheduled entity; and communicating with the scheduled entity via the SCell according to the desired activity mode.

In another aspect, a wireless communication device includes a processor; a transceiver communicatively coupled to the processor; and a memory communicatively coupled to the processor. The processor and the memory are configured to transmit, to a scheduled entity via a primary cell, first downlink control information (DCI). The first DCI message includes a secondary cell dormancy indication (SDI). The SDI indicates a desired activity mode of a secondary cell (SCell) with respect to the scheduled entity. The processor and the memory are further configured to receive, from the scheduled entity via the primary cell (PCell), first DCI-acknowledgment (DCI-ACK) information. The first DCI-ACK information includes one or more bits indicating whether the first DCI message was successfully received by the scheduled entity. The processor and the memory are further configured to communicate with the scheduled entity via the SCell according to the desired activity mode.

In another aspect, a wireless communication device includes means for transmitting, to a scheduled entity via a primary cell, a first downlink control information (DCI) message. The first DCI message includes a secondary cell dormancy indication (SDI). The SDI indicates a desired activity mode of a secondary cell (SCell) with respect to the scheduled entity. The device further includes means for receiving, from the scheduled entity via the primary cell (PCell), first DCI-acknowledgment (DCI-ACK) information. The first DCI-ACK information includes one or more bits indicating whether the first DCI message was successfully received by the scheduled entity. The device further includes means for communicating with the scheduled entity via the SCell according to the desired activity mode.

In another aspect, a non-transitory computer-readable medium storing computer-executable code includes code for causing a wireless communication device to transmit, to a scheduled entity via a PCell, a first downlink control information (DCI) message. The first DCI message includes a secondary cell dormancy indication (SDI). The SDI indicates a desired activity mode of a secondary cell (SCell) with respect to the scheduled entity. The computer-executable code further includes code for causing the device to receive from the scheduled entity via the PCell, first DCI-acknowledgment (DCI-ACK) information that includes one or more bits indicating whether the first DCI message was successfully received by the scheduled entity. The computer-executable code further includes code for causing the device to communicate with the scheduled entity via the SCell according to the desired activity mode.

These and other aspects of the technology discussed herein will become more fully understood upon a review of the detailed description, which follows. Other aspects, features, and examples will become apparent to those skilled in the art upon reviewing the following description certain examples in conjunction with the accompanying figures. While the following description may discuss various advantages and features relative to certain embodiments and figures, all embodiments can include one or more of the advantageous features discussed herein. In other words, while this description may discuss one or more examples as having certain advantageous features, one or more of such features may also be used in accordance with the various examples discussed herein. In similar fashion, while this description may discuss exemplary embodiments as device, system, or method embodiments it should be understood that such exemplary embodiments can be implemented in various devices, systems, and methods.

DETAILED DESCRIPTION

Figure 1:
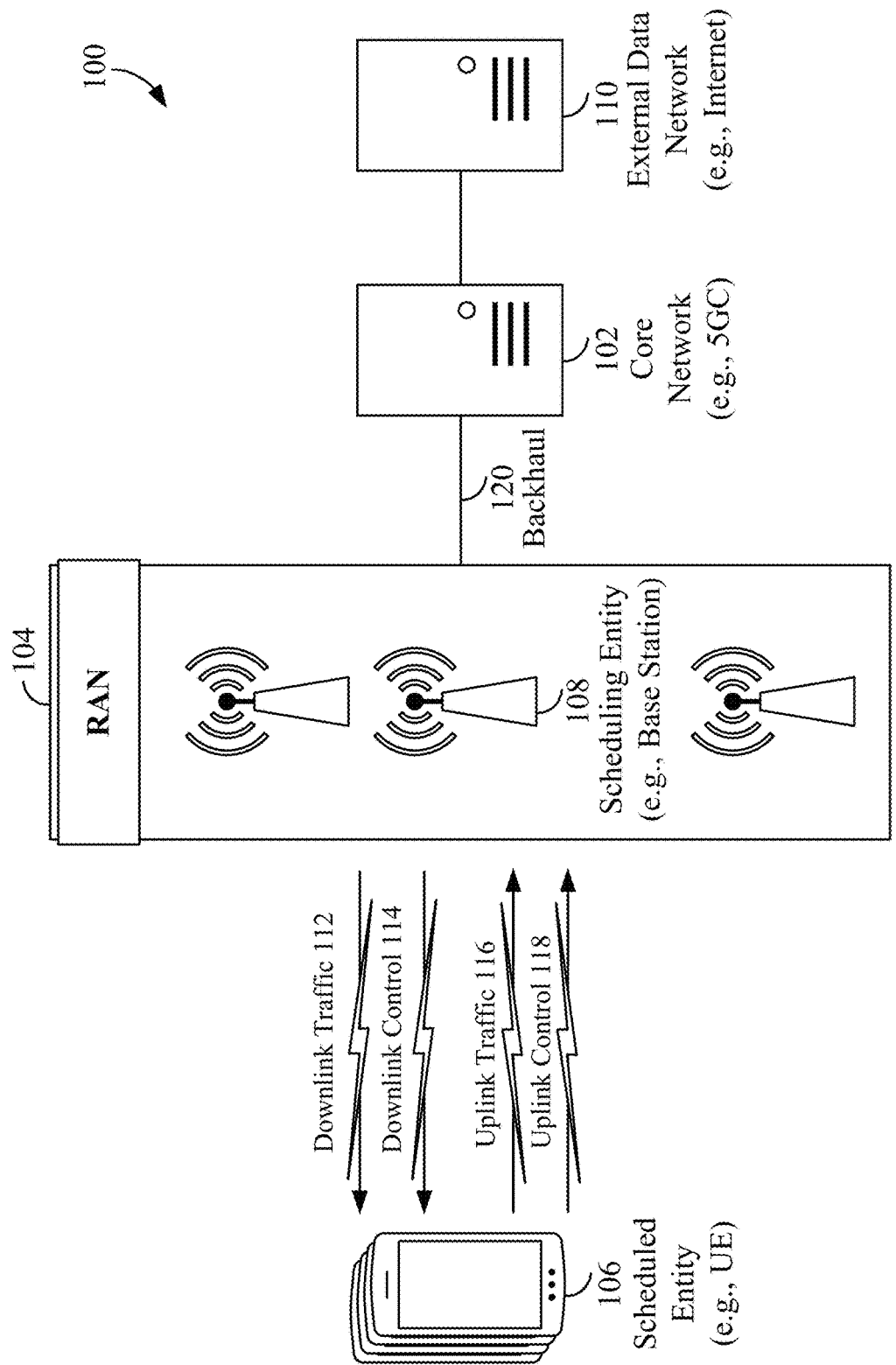
FIG. 1 is a schematic illustration of a wireless communication system according to some embodiments.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, those skilled in the art will readily recognize that these concepts may be practiced without these specific details. In some instances, this description provides well known structures and components in block diagram form in order to avoid obscuring such concepts.

While this description describes aspects and embodiments by illustration to some examples, those skilled in the art will understand that additional implementations and use cases may come about in many different arrangements and scenarios. Innovations described herein may be implemented across many differing platform types, devices, systems, shapes, sizes, and/or packaging arrangements. In an example, embodiments and/or uses may come about via integrated chip (IC) embodiments and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may span over a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described embodiments. In an example, transmission and reception of wireless signals necessarily includes a number of components for analog and digital purposes (e.g., hardware components including antenna, radio frequency (RF) chains, power amplifiers, modulators, buffer, processor(s), interleaver, adders/summers, etc.). It is intended that the disclosed technology may be practiced in a wide variety of devices, chip-level components, systems, distributed arrangements, aggregated or dis-aggregated, end-user devices, etc. of varying sizes, shapes, and constitution.

Techniques presented herein aim to aid and/or resolve resource allocation and/or usage conflicts. In some aspects, the present disclosure provides several approaches and features configured to resolve potential or actual conflicts in frequency allocation. These may arise, for example, in scenarios involving a Type 1 frequency domain resource allocation in sub-band full-duplex (SBFD). In some scenarios, allocated downlink resources may overlap with resources that a slot format has designated for uplink communication. By addressing this overlap, as discussed herein, communication device performance and system throughput are improved.

The disclosure that follows presents various concepts that may be implemented across a broad variety of telecommunication systems, network architectures, and communication standards. Referring now to FIG. 1, as an illustrative example without limitation, this schematic illustration shows various aspects of the present disclosure with reference to a wireless communication system 100. The wireless communication system 100 includes several interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to facilitate communication between a UE 106 and a scheduling entity 108 (e.g., by providing radio access to the UE 106). In an example, the RAN 104 may operate according to 3rd Generation Partnership Project (3GPP) New Radio (NR) specifications, often referred to as 5G or 5G NR. In some examples, the RAN 104 may operate under a hybrid of 5G NR and Evolved Universal Terrestrial Radio Access Network (eUTRAN) standards, often referred to as Long-Term Evolution (LTE). 3GPP refers to this hybrid RAN as a next-generation RAN, or NG-RAN. Of course, many other examples may be utilized within the scope of the present disclosure.

NR access may support various wireless communication services. This can include enhanced mobile broadband (eMBB) targeting wide bandwidth (e.g., 80 MHz or beyond), millimeter wave (mmW) targeting high carrier frequency (e.g., e.g., 24 GHz to 53 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

As illustrated, the RAN 104 includes at least one scheduling entity 108, where in some examples, the scheduling entity 108 may be a base station (BS). Broadly, a BS is a network element in a radio access network that provides radio transmission and reception in one or more cells to or from a scheduled entity 106 (e.g., a UE). In different technologies, standards, or contexts, those skilled in the art may variously refer to a 'base station' as a base transceiver station (BTS), a radio base station, a radio transceiver, a transceiver function, a basic service set (BSS), an extended service set (ESS), an access point (AP), a Node B (NB), an eNode B (eNB), a gNode B (gNB), or some other suitable terminology.

The radio access network (RAN) 104 supports wireless communication for multiple mobile apparatuses. Those skilled in the art may refer to a mobile apparatus as a UE, as in 3GPP specifications, but may also refer to a UE as a mobile station (MS), a subscriber station, a mobile unit, a subscriber unit, a wireless unit, a remote unit, a mobile device, a wireless device, a wireless communication device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides access to network services. A UE may take on many forms and can include a range of devices.

Within the present document, a "mobile" apparatus (aka a UE) need not necessarily have a capability to move, and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quadcopter, a remote control device, a consumer and/or wearable device, such as eyewear, a wearable camera, a heads-up display, an extended reality (XR)-enabling device (e.g., a virtual reality (VR) device), a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc.; an industrial automation and enterprise device; a logistics controller; agricultural equipment; military defense equipment, vehicles, aircraft, ships, and weaponry, etc. Still further, a mobile apparatus may provide for connected medicine or telemedicine support, e.g., health care at a distance. Telehealth devices may include telehealth monitoring devices and telehealth administration devices, whose communication may be given preferential treatment or prioritized access over other types of information, e.g., in terms of prioritized access for transport of critical service data, and/or for relevant QoS for transport of critical service data.

Wireless communication between a RAN 104 and a UE 106 may be described as utilizing an air interface. Transmissions over the air interface from a base station (e.g., base station 108) to one or more UEs (e.g., UE 106) may be referred to as downlink (DL) transmission. In accordance with certain aspects of the present disclosure, the term downlink may refer to a point-to-multipoint transmission originating at a scheduling entity (described further below; e.g., base station 108). Another way to describe this technique may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point transmission originating at a scheduled entity (described further below; e.g., UE 106). As illustrated in FIG. 1, a scheduling entity 108 may manage DL traffic 112 to one or more scheduled entities 106, and UL traffic 116 from one or more scheduled entities 106.

In some examples, access to the air interface may be scheduled. This can include where a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs 106, which may be scheduled entities, may utilize resources allocated by the scheduling entity 108. In an example, the scheduled entities 106 may include entities (e.g., UEs) scheduled for communication that are configured to utilize resources allocated by the scheduling entity 108.

It should be noted that base stations (BSs) are not the only entities that may function as scheduling entities. That is, in some examples, a UE may function as a scheduling entity 108. A UE, as such, may be configured to schedule resources for one or more scheduled entities (e.g., one or more other UEs) in wireless communication system 100.

As illustrated in FIG. 1, a scheduling entity 108 may broadcast downlink (DL) traffic 112 to one or more scheduled entities 106. Broadly, the scheduling entity 108 is a node or device responsible for scheduling traffic in a wireless communication network, including the DL traffic 112 and, in some examples, uplink (UL) traffic 116 from one or more scheduled entities 106 to the scheduling entity 108. On the other hand, the scheduled entity 106 is a node or device that receives DL control information (DCI) 114, including but not limited to scheduling information (e.g., a grant), synchronization or timing information, or other control information from another entity in the wireless communication network (e.g., from a scheduling entity 108).

In general, scheduling entities 108 (e.g., base stations (BSs)) may include a backhaul interface for communication with a backhaul 120 of the wireless communication system 100. The backhaul 120 may provide a link between a scheduling entity 108 and a core network 102. Further, in some examples, a backhaul 120 may provide interconnection between multiple scheduling entities 108 (e.g., between a first BS and a second BS, etc.). Various types of interfaces for the backhaul 120 may be employed, such as a direct physical connection, a virtual network, or the like using any suitable transport network.

The core network 102 may be a part of the wireless communication system 100, and may be independent of the radio access technology (RAT) used in the RAN 104. In some examples, the core network 102 may be configured according to NR specifications (e.g., 5GC). In another example, the core network 102 may be configured according to a 4G evolved packet core (EPC), or any other suitable standard or configuration.

It should be noted that the techniques described herein may be used for various wireless networks and radio technologies. While some aspects of the present disclosure may be described using terminology commonly associated with 3G, 4G, and/or new radio (e.g., 5G NR) wireless technologies, aspects of the disclosed technology can be applied in other generation-based communication systems as would be understood by a person skilled in the art.

In general, any number of wireless networks may be deployed in a given geographic area. Each wireless network may support a particular radio access technology (RAT) and may operate on one or more frequencies. Those skilled in the art may variously refer to a RAT as a radio technology, an air interface, etc. Those skilled in the art may further refer to a frequency as a carrier, a subcarrier, a frequency channel, a component carrier, a tone, a subband, etc. Each frequency may support a single RAT in a given geographic area in order to avoid interference between wireless networks of different RATs.

Figure 2:
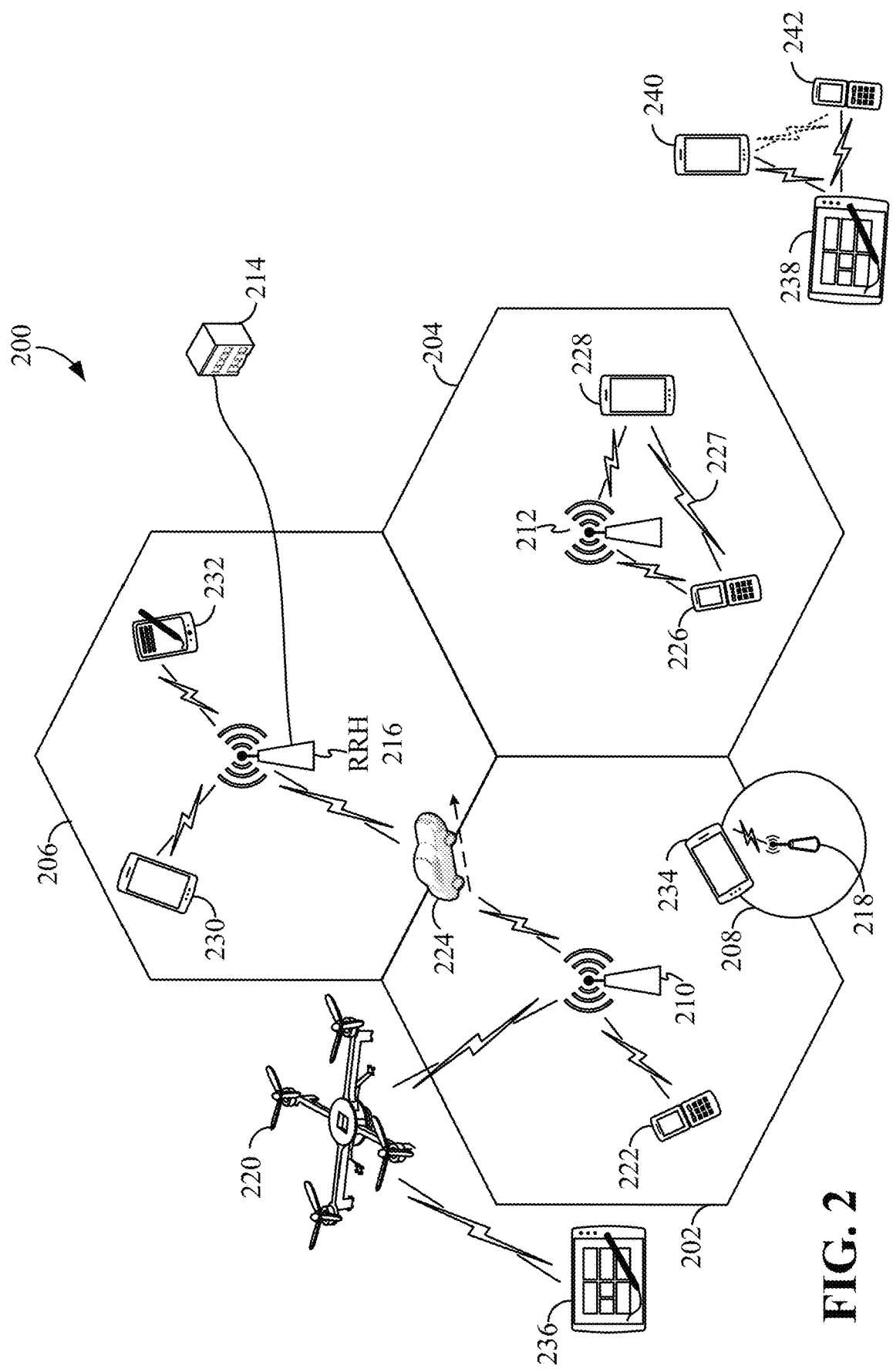
FIG. 2 is a conceptual illustration of an example of a radio access network according to some embodiments.

FIG. 2 provides a schematic illustration of a RAN 200, by way of example and without limitation. In some examples, the RAN 200 may be the same as the RAN 104 described, for example, with reference to FIG. 1. For example, the RAN 200 may be an NR system (e.g., a 5G NR network). The RAN 200 may be in communication with a core network 102. The core network 102 may be in communication with one or more BSs 210, 212, 214, and/or 218 and/or UEs 222, 224, 226, 228, 230, 232, 234, 236, 238, 240, and/or 242 in the RAN 200 via one or more interfaces.

The geographic area covered by the RAN 200 may be divided into cellular regions (cells) that a user equipment (UE) can uniquely identify based on an identification broadcasted from an access point or scheduling entity 108 (e.g., a base station). FIG. 2 illustrates macro cells 202, 204, and 206, and a small cell 208, each of which may include one or more sectors (not shown). A sector is generally a sub-area of a cell. In some examples, a particular scheduling entity 108 may serve each sector included within a given cell. A radio link within a sector can be identified by a single logical identification belonging to that sector. In a cell that is divided into sectors, the multiple sectors within a cell can be formed by groups of antennas with each antenna responsible for communication with UEs in a portion of the cell.

FIG. 2 shows two base stations (BSs) 210 and 212 in cells 202 and 204; and shows a third base station 214 controlling a remote radio head (RRH) 216 in cell 206. That is, a base station can have an integrated antenna or can be connected to an antenna or RRH by feeder cables. In the illustrated example, the cells 202, 204, and 206 may be referred to as macro cells, as the BSs 210, 212, and 214 support cells having a large size. Further, a base station 218 is shown in the small cell 208 (e.g., a micro cell, pico cell, femto cell, home base station, home Node B, home eNode B, etc.) which may overlap with one or more macro cells. In this example, the cell 208 may be referred to as a small cell, as the base station 218 supports a cell having a relatively small size. Cell sizing can be done according to system design as well as component constraints.

The RAN 200 may include any number of wireless BSs and cells. Further, a RAN may include a relay node to extend the size or coverage area of a given cell. The BSs 210, 212, 214, 218 provide wireless access points to a core network 102 for any number of mobile apparatuses. In some examples, the BSs 210, 212, 214, and/or 218 may correspond to one or more of the scheduling entities 108 described, for example, with reference to FIG. 1.

FIG. 2 further includes a quadcopter or drone 220, which may be configured to function as a scheduling entity 108 (e.g., a BS). That is, in some examples, a cell may not necessarily be stationary, and the geographic area of the cell may move according to the location of a mobile base station such as the quadcopter 220.

Within the RAN 200, the cells may include UEs that may be in communication with one or more sectors of each cell. Further, each base station 210, 212, 214, 218, and 220 may be configured to provide an access point (AP) to a core network 102 (e.g., via a network controller) for the UEs in the respective cells. For example, UEs 222 and 224 may be in communication with base station 210; UEs 226 and 228 may be in communication with base station 212; UEs 230 and 232 may be in communication with base station 214 by way of RRH 216; UE 234 may be in communication with base station 218; and UE 236 may be in communication with mobile base station 220. In some examples, the UEs 222, 224, 226, 228, 230, 232, 234, 236, 238, 240, and/or 242 may be the same as the UE/scheduled entity 106 described, for example, with reference to FIG. 1.

In some examples, a mobile network node (e.g., quadcopter 220) may be configured to function as a UE. For example, the quadcopter 220 may operate within cell 202 by communicating with base station 210.

In a further aspect of the RAN 200, sidelink signals may be used between UEs without necessarily relying on scheduling or control information from a base station. For example, two or more UEs (e.g., UEs 226 and 228) may communicate with each other using peer-to-peer (P2P) or sidelink signals 227 without relaying that communication through a base station (e.g., base station 212). In a further example, UE 238 is illustrated communicating with UEs 240 and 242. Here, the UE 238 may function as a scheduling entity or a primary sidelink device, and UEs 240 and 242 may function as a scheduled entity or a non-primary (e.g., secondary) sidelink device. In still another example, a UE may function as a scheduling entity in a device-to-device (D2D), P2P, or vehicle-to-vehicle (V2V) network, and/or in a mesh network. In a mesh network example, UEs 240 and 242 may communicate directly with one another and/or may communicate with the scheduling entity 238. Thus, in a wireless communication system 100 with scheduled access to time-frequency resources and having a cellular configuration, a P2P configuration, or a mesh configuration, a scheduling entity and one or more scheduled entities may communicate utilizing the scheduled resources.

The air interface in the radio access network 200 may utilize one or more duplexing algorithms. 'Duplex' generally refers to scenarios where a point-to-point communication link where both endpoints can communicate with one another in both directions. 'Full duplex' generally refers to scenarios where both endpoints can simultaneously communicate with one another. 'Half duplex' generally refers to scenarios where only one endpoint can send information to the other at a time. Full duplex emulation is frequently implemented for wireless links by utilizing frequency division duplex (FDD) or time division duplex (TDD). In FDD, transmissions in different directions operate at different carrier frequencies. In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot.

The air interface in the radio access network 200 may utilize one or more multiplexing and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to such techniques. For example, a UE may provide for UL multiple access utilizing time division multiple access (TDMA), time division synchronous code division multiple access (TD-SCDMA), code division multiple access (CDMA), frequency division multiple access (FDMA), sparse code multiple access (SCMA), resource spread multiple access (RSMA), or other suitable multiple access techniques. Further, a base station 210 may multiplex DL transmissions to UEs 222 and 224 utilizing time division multiplexing (TDM), code division multiplexing (CDM), frequency division multiplexing (FDM), orthogonal frequency division multiplexing (OFDM), sparse code multiplexing (SCM), or other suitable multiplexing techniques.

Various aspects of the present disclosure will be described with reference to an OFDM waveform, schematically illustrated in FIG. 3. It should be understood by those of ordinary skill in the art that the various aspects of the present disclosure may be applied to a DFT-s-OFDMA waveform in substantially the same way as described herein below. That is, while some examples of the present disclosure may focus on an OFDM link for clarity, it should be understood that the same principles may be applied as well to DFT-s-OFDMA waveforms.

In some examples, a frame may refer to a predetermined duration of time (e.g., 10 ms) for wireless transmissions. And further, each frame may consist of a set of subframes (e.g., 10 subframes of 1 ms each). On a given carrier, there may be one set of frames in the uplink (UL), and another set of frames in the downlink (DL). Referring now to FIG. 3, an expanded view of an exemplary DL subframe 302 is illustrated, showing an OFDM resource grid 304. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers or tones.

The resource grid 304 may be used to schematically represent time-frequency resources for a given antenna port. That is, in a MIMO implementation with multiple antenna ports available, a corresponding multiple number of resource grids 304 may be available for communication. The resource grid 304 is divided into multiple resource elements (REs) 306. An RE, which is 1 subcarrier×1 symbol, is the smallest discrete part of the time-frequency grid, and contains a single complex value representing data from a physical channel or signal. Depending on the modulation utilized in a particular implementation, each resource element (RE) may represent one or more bits of information. In some examples, a block of REs may be referred to as a physical resource block (PRB) or more simply a resource block (RB) 308, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB, such as the RB 308, entirely corresponds to a single direction of communication (either transmission or reception for a given device).

A UE generally utilizes only a subset of the resource grid 304. An RB may be the smallest unit of resources that can be allocated to a UE. Thus, the more RBs scheduled for a UE, and the higher the modulation technique chosen for the air interface, the higher the data rate for the UE.

In this illustration, the RB 308 is shown as occupying less than the entire bandwidth of the subframe 302, with some subcarriers illustrated above and below the RB 308. In a given implementation, the subframe 302 may have a bandwidth corresponding to any number of one or more RBs 308. Further, in this illustration, the RB 308 is shown as occupying less than the entire duration of the subframe 302, although this is merely one possible example.

Subframes may have a variety of features that may be configurable. In some examples, subframes may have a fixed duration or length or configurable duration or length. In some examples, a subframe can be 1 millisecond (ms). In some scenarios, each 1 ms subframe 302 may consist of one or multiple adjacent slots (e.g., a series of consecutive slots). In FIG. 3, one subframe 302 includes four slots 310, as an illustrative example. In some examples, a slot may be defined according to a specified number of orthogonal frequency division multiplexing (OFDM) symbols with a given cyclic prefix (CP) length. For example, a slot may include 7 or 14 OFDM symbols with a nominal CP. Additional examples may include mini-slots having a shorter duration (e.g., one or two OFDM symbols). A scheduling entity 108 may, in some cases, transmit these mini-slots occupying resources scheduled for ongoing slot transmissions for the same or for different scheduled entities 106.

An expanded view of one of the slots 310 illustrates the slot 310 including a control region 312 and a data region 314. In general, the control region 312 may carry control channels (e.g., PDCCH), and the data region 314 may carry data channels (e.g., physical downlink shared channel (PDSCH) or physical uplink shared channel (PUSCH)). Of course, a slot may contain all DL, all UL, or at least one DL portion and at least one UL portion. The structure illustrated in FIG. 3 is merely exemplary in nature, and different slot structures may be utilized, and may include one or more of each of the control region(s) and data region(s).

Figure 3:
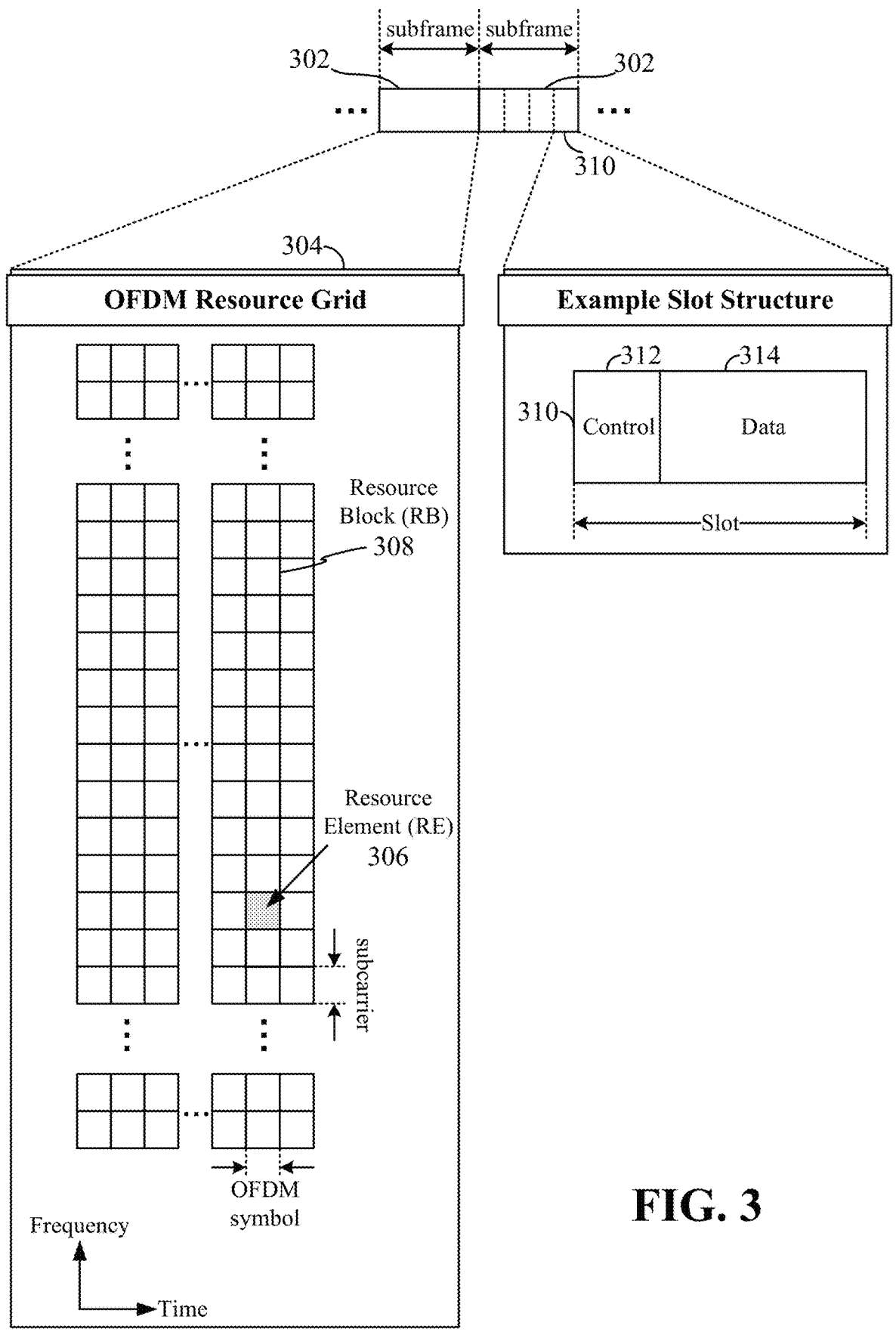
FIG. 3 is a schematic illustration of an organization of wireless resources in an air interface utilizing orthogonal frequency divisional multiplexing (OFDM) according to some embodiments.

Although not explicitly illustrated in FIG. 3, the various REs 306 within an RB 308 may be scheduled to carry one or more physical channels, including control channels, shared channels, data channels, etc. Other REs 306 within the RB 308 may also carry pilots or reference signals (RSs). These pilots or reference signals may provide for a receiving device to perform channel estimation of the corresponding channel, which may enable coherent demodulation/detection of the control and/or data channels within the RB 308.

In a downlink (DL) transmission, the transmitting device (e.g., a scheduling entity 108) may allocate one or more resource elements (REs) 306 (e.g., within a control region 312 of a given slot 310, subslot, etc.) to carry DL control information (DCI) 114 (e.g., via one or more DL control channels). In an example, DL control channels may include DCI 114 (e.g., one or more DCI messages) that generally carries information originating from higher layers, such as a physical broadcast channel (PBCH), a physical downlink control channel (PDCCH), etc., to one or more scheduled entities 106. The PDCCH may carry downlink control information (DCI) 114 for one or more UEs in a cell. This can include, but is not limited to, power control commands, scheduling information, a grant, and/or an assignment of REs for DL and/or UL transmissions.

Further, the scheduling entity 108 may allocate a portion of a slot's resources (e.g., one or more DL REs) to carry DL physical signals that generally do not carry information originating from higher layers. These DL physical signals may include a primary synchronization signal (PSS); a secondary synchronization signal (SSS); demodulation reference signals (DM-RSs); phase-tracking reference signals (PT-RSs); channel state information reference signals (CSI-RSs); etc. In such examples, DL resources may be allocated to carry such DL physical signals.

A scheduling entity 108 may transmit the synchronization signals (e.g., a PSS and an SSS; collectively referred to as SSs), and in some examples, the PBCH, in an SS block that includes four consecutive OFDM symbols, numbered via a time index in increasing order from 0 to 3. In the frequency domain, the SS block may extend over 240 contiguous subcarriers, with the subcarriers being numbered via a frequency index in increasing order from 0 to 239. Of course, the present disclosure is not limited to this specific SS block configuration. Other non-limiting examples may utilize greater or fewer than two synchronization signals; may include one or more supplemental channels in addition to the PBCH; may omit a PBCH; and/or may utilize non-consecutive symbols for an SS block, to name but a few examples.

In an uplink (UL) transmission, a scheduling entity 108 may allocate a portion of a slot's resources for a transmitting device (e.g., UE or a scheduled entity 106) to carry UL control information 118 (UCI). In an example, the transmitting device may utilize one or more resource elements (REs) 306 to carry one or more UL control channels, such as a physical uplink control channel (PUCCH), a physical random access channel (PRACH), etc., to the scheduling entity 108. Such UL control channels may include UCI 118, for example. Further, UL REs may carry UL physical signals that generally do not carry information originating from higher layers, such as demodulation reference signals (DM-RSs), phase-tracking reference signals (PT-RSs), sounding reference signals (SRSs), etc. In some examples, the UCI 118 may include a scheduling request (SR) (e.g., a request for the scheduling entity 108 to schedule uplink transmissions). In such examples, the scheduling entity 108 may, in response to the SR transmitted on the UL control channel (e.g., a PUCCH), transmit downlink control information (DCI) 114 that may schedule resources for uplink packet transmissions.

The uplink (UL) control information (UCI) may also include hybrid automatic repeat request (HARQ) feedback such as an acknowledgment (ACK) or negative acknowledgment (NACK), channel state information (CSI), or any other suitable UCI. HARQ is a technique well-known to those in the art, wherein a receiving device may check the integrity of packet transmissions for accuracy, e.g., utilizing any suitable integrity checking mechanism, such as a checksum or a cyclic redundancy check (CRC). If the receiving device (e.g., a scheduled entity 106) confirms the integrity of the downlink (DL) transmission, the receiving device may transmit an ACK to the transmitting device (e.g., a scheduling entity 108). If the receiving device is unable to confirm the integrity of the DL transmission, the receiving device may transmit a NACK to the transmitting device. In response to a NACK, the transmitting device may send a HARQ retransmission, which may implement chase combining, incremental redundancy, etc.

Hybrid automatic repeat request acknowledgment (HARQ-ACK) techniques may utilize one or more codebooks specifying the extent of individual HARQ-ACK transmissions (e.g., how many bits of information are included in each transmission) and the information content of those transmissions (e.g., what each bit or set of bits represents). HARQ-ACK messages transmitted by a UE may include various ACK/NACK information corresponding to, for example, a PDCCH, a PDSCH, and/or other units of information such as transport blocks (TBs), code blocks (CBs), and/or code block groups (CBGs). For example, a codebook may specify a set of time intervals and serving cells (e.g., carriers) in which a base station (BS) transmits a PDSCH for which the BS may expect a corresponding NACK/ACK response from the UE.

Figure 6:
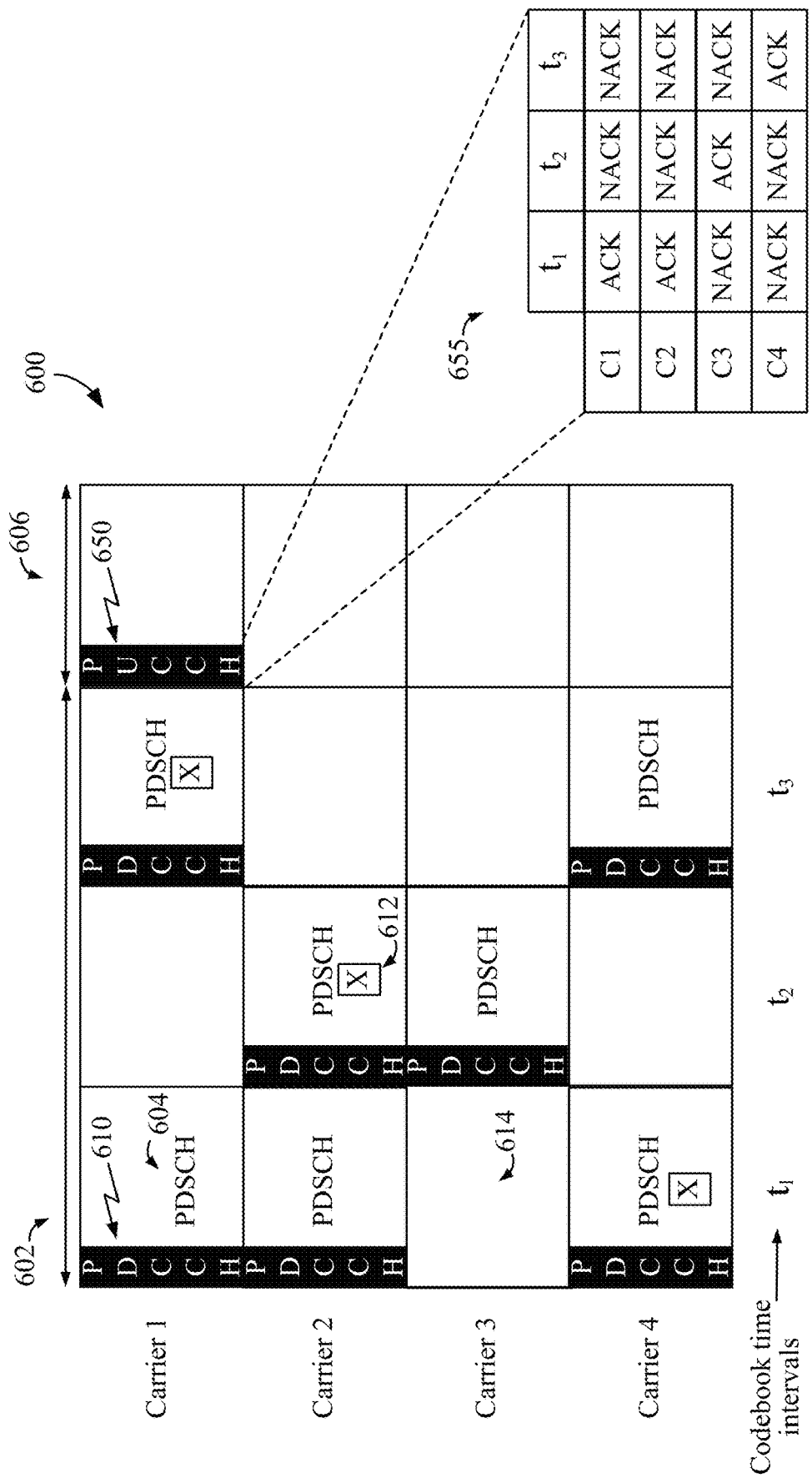
FIG. 6 is a schematic illustrating elements of hybrid automatic repeat request acknowledgment (HARQ-ACK) transmission according to a semi-static codebook.

In some examples, the codebook may be semi-static. In an example, the codebook may specify that HARQ-ACK data is sent for all possible times and carriers, regardless of whether each carrier is currently in use (e.g., scheduled) for data transport between the BS and the UE. Features of a semi-static codebook 600 are illustrated in FIG. 6.

In another example, the codebook may be dynamic. When utilizing a dynamic HARQ-ACK codebook 700, the UE 106 only transmits HARQ-ACK information corresponding to carriers currently scheduled for data transmission. Features of a dynamic HARQ-ACK codebook 700 are illustrated in FIG. 7.

When a dynamic HARQ-ACK codebook 700 is used, a scheduling entity 108 (e.g., a base station (BS)) may assign downlink assignment index (DAI) values to each DCI message. In this way, the scheduling entity 108 may be able to determine whether a UE 106 has missed a DCI message.

Figure 7:
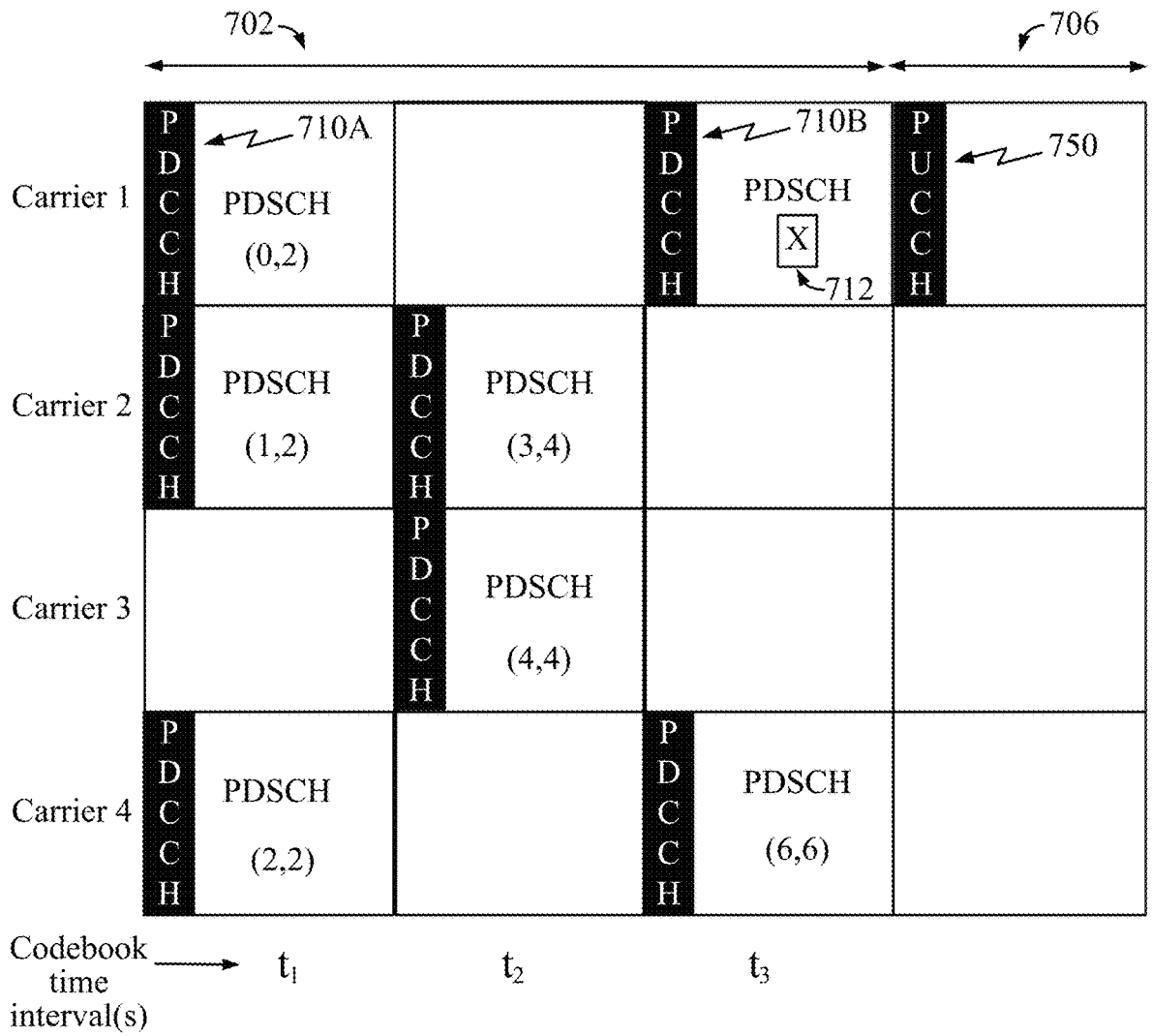
FIG. 7 is a schematic illustrating elements of HARQ-ACK transmission according to a dynamic codebook.

FIG. 7 shows each physical downlink shared channel (PDSCH) labeled with a counter DAI value (T) and a total DAI value (T). PDSCH transmissions that are not successfully received by the UE 106 are denoted by an 'X' 712. A single counter DAI value may be used when only one carrier is in use (e.g., the primary component carrier). If the counter DAI values do not form a continuous list of integers (e.g., 0, 1, 2) and instead form a discontinuous list (e.g., 1, 3, 4 . . . ), the UE can infer that it has missed a particular DCI message. The UE 106 may transmit a negative acknowledgment (NACK) for the missed DCI message in the uplink (UL) slot 706.

When multiple carriers (e.g., cells) are used, a scheduling entity 108 may additionally utilize a total DAI value ('j') for each DCI message. This total DAI value can allow the UE 106 to determine how many NACK/ACKs are expected based on the number of carriers or serving cells in use (e.g., one primary cell and three secondary cells). In such examples, the counter DAI value for each DCI message may still be used as described above to assign sequential numbers to each DCI message (e.g., T=1 through 6 in the example of FIG. 7). The total DAI value may then be used (e.g., in tandem) to indicate the total number of DCI messages transmitted up to a particular time within the time interval covered by the dynamic HARQ-ACK codebook 700 during a dynamic HARQ-ACK codebook period 702.

In the illustrated and non-limiting example of FIG. 7, the initial starting point for counting begins with '0' as the initial starting point. That is, three total DCI messages (e.g., three PDCCHs) are transmitted during time interval $t_1$, two total DCIs (e.g., two PDCCHs) are transmitted during time interval $t_2$, and two total DCIs (e.g., two PDCCHs) are transmitted during time interval $t_3$. In the example of FIG. 7, the scheduled entity 106 fails to receive successfully (e.g., correctly decode) the scheduled data (e.g., the PDSCH) and/or the PDCCH (e.g., a sixth DCI message) that would correspond to a DAI value of (i=5, j=6). As described in more detail below, the scheduled entity 106 here may have failed to receive successfully the DCI message, which in turn would cause the scheduled entity 106 to miss the corresponding PDSCH, or the scheduled entity 106 may have received successfully the DCI message but may have failed to receive successfully the PDSCH (e.g., due to a transmission error, a failure to decode the PDSCH, etc.). In any case, the scheduled entity 106 may include appropriate ACK/NACK information when transmitting PUCCH 750.

It should be noted, a person of ordinary skill in the art will understand that PUCCH 650 in FIG. 6 and PUCCH 750 in FIG. 7 may represent examples of PUCCH 550 described with reference to FIG. 5, transmitted via a PCell (e.g., Carrier 1). Likewise, a person of ordinary skill in the art will understand that PDCCH 610 of FIG. 6 and PDCCH 710A or PDCCH 710B of FIG. 7 may represent examples of PDCCH 510 of FIG. 5.

In addition to downlink control information (DCI), a scheduling entity 108 may allocate one or more REs 306 (e.g., within the data region 314) for user data or traffic data. One or more traffic channels may carry such traffic (e.g., data traffic). In such examples, the one or more traffic channels may include, in various circumstances, a physical downlink shared channel (PDSCH) transmission for downlink (DL) transmissions (e.g., DL traffic 112), a physical uplink shared channel (PUSCH) for uplink (UL) transmissions (e.g., UL traffic 116), etc.

For a scheduled entity 106 to gain initial access to a cell, the RAN may provide system information (SI) characterizing the cell. The RAN may provide this SI utilizing minimum system information (MSI), and other system information (OSI). The RAN may periodically broadcast the MSI over the cell to provide the most basic information a scheduled entity 106 requires for initial cell access, and for enabling a scheduled entity 106 to acquire any OSI that the RAN may broadcast periodically or send on-demand. In some examples, a network may provide MSI over two different downlink channels. For example, the PBCH may carry a master information block (MIB), and the PDSCH may carry a system information block type 1 (SIB1). Here, the MIB may include a UE with parameters for monitoring a control resource set. The control resource set may thereby provide the UE with scheduling information corresponding to the PDSCH, e.g., a resource location of SIB1. Those skilled in the art variously refer to SIB1 as remaining minimum system information (RMSI).

In some examples, OSI may include any SI that is not broadcast in the MSI. In some examples, the PDSCH may carry a plurality of SIBs, not limited to SIB 1. Here, the RAN may provide the OSI in these SIBs, e.g., SIB2 and above.

The channels or carriers described, for example, with reference to FIGS. 1 and 3, are not necessarily all the channels or carriers that may be utilized between a scheduling entity 108 and scheduled entities 106. Those of ordinary skill in the art will recognize that other channels or carriers may be utilized in addition to those illustrated, such as other traffic, control, and feedback channels.

In some examples, a physical (PHY) layer may generally multiplex and map physical channels (e.g., those physical channels described above) to transport channels for handling at a medium access control (MAC) layer entity. Transport channels carry blocks of information called transport blocks (TBs). The transport block size (TBS), which may correspond to a number of bits of information, may be a controlled parameter, based on the modulation and coding scheme (MCS) and the number of RBs in a given transmission.

Serving Cells

Carrier aggregation generally refers to the combination of two or more serving cells (e.g., a plurality of carriers or component carriers) into one data communication link, e.g., to improve bandwidth, throughput, reliability, etc. 5G New Radio (NR) networks may provide for carrier aggregation of sub-6 GHz carriers, above-6 GHz carriers, millimeter wave (mmWave) carriers, etc., all controlled by a single integrated medium access control (MAC) layer. Each individual serving cell represents a carrier the network aggregates to combine with one or more serving cells (e.g., carrier(s)) to provide such carrier aggregation.

Carrier aggregation may allow a user equipment (UE) to connect with (e.g., be configured with) multiple distinct serving cells. One special serving cell may be referred to as the primary cell (PCell) (e.g., a primary component carrier or 'Carrier 1' ('C1') described with reference to FIG. 6, for example). The other serving cells of the multiple distinct serving cells include secondary cells (SCells) (e.g., Carriers 2-4 described with reference to FIG. 6, for example).

In New Radio (NR) deployments, a UE behavior is defined for a secondary cell (SCell). Those skilled in the art may variously refer to UE behavior for an SCell as UE 'dormancy' behavior, and in some instances, as SCell dormancy behavior. UE dormancy behavior may include non-dormancy behavior for a non-dormant or activate SCell and dormancy behavior for a dormant or inactivate SCell (e.g., an idling SCell).

The network (e.g., one or more scheduling entities 108) can provide a UE (e.g., a scheduled entity 106) with an SCell dormancy indication (SDI). Based on the SDI, the UE may switch its behavior with respect to a secondary cell (SCell) from 'non-dormancy' behavior to 'dormancy' behavior, and vice-versa, to implement various UE dormancy behaviors relative to the SCell. When the UE is configured for 'non-dormancy' behavior with respect to a given SCell, the UE has full utilization of the SCell as usual (e.g., as with the PCell).

When an activated SCell is configured for dormancy behavior (e.g., transitioning UE behavior from non-dormancy behavior to dormancy relative to a particular SCell), UE activity is reduced on the SCell. This may be done for power savings. In an example, when a UE is configured with dormancy behavior for a particular SCell, the UE may: 1) cease performing physical downlink control channel (PDCCH) monitoring for the SCell, 2) cease monitoring for physical downlink shared channel (PDSCH) reception for the SCell; and/or 3) reduce channel state information (CSI) measurement (e.g., estimation) activities and/or CSI reporting frequency.

When multiple SCells are configured for communicating with a UE, the SCell dormancy indication (SDI) can be applied to individual SCells of the multiple SCells. In another example, the dormancy indication can be applied to SCell groups (e.g., a set of SCells).

Discontinuous Reception (DRX)

Figure 4:
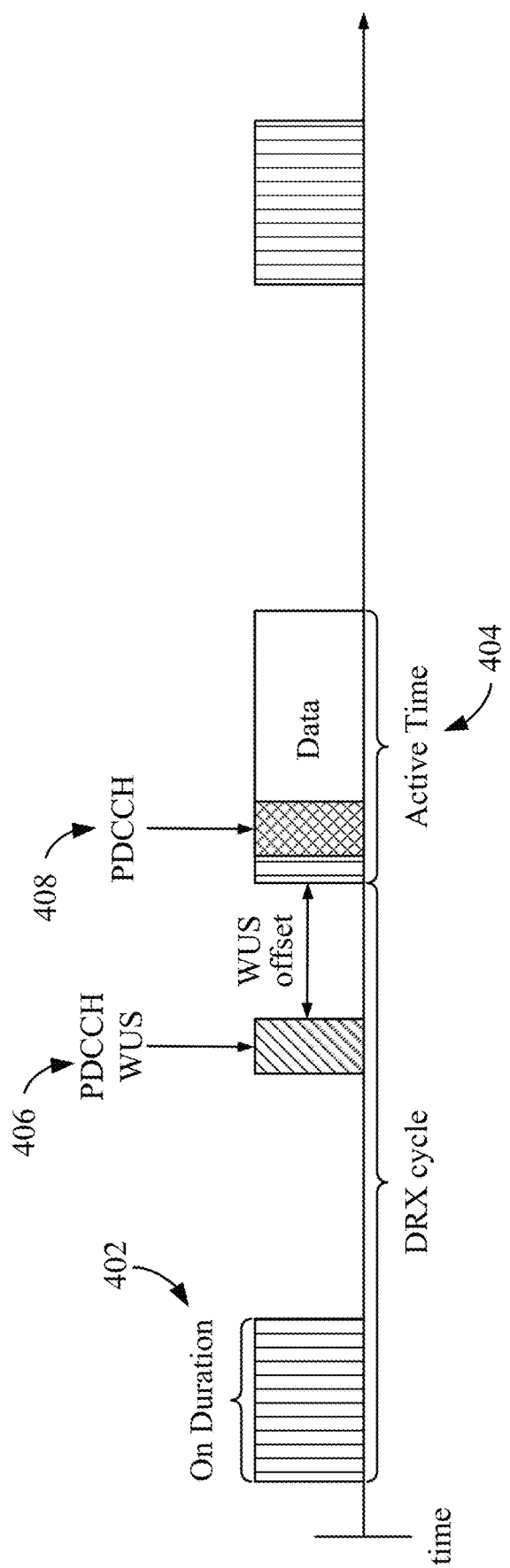
FIG. 4 is a schematic illustration of an example discontinuous reception (DRX) scenario.

In some cases, a user equipment (UE) may be put in a Discontinuous Reception (DRX) mode for power savings. As illustrated in FIG. 4, in DRX mode, the UE goes to sleep to save power and wakes up periodically to monitor the physical downlink control channel (PDCCH) for potential scheduled downlink reception and/or uplink transmission for the UE. If DRX is not configured, the UE is always ready to receive PDCCH.

As illustrated in FIG. 4, DRX consists of a sleep portion and a wakeup portion 402. The wakeup portion is called the "On Duration" where the UE monitors for a PDCCH transmission that schedules data. If a PDCCH (carrying one or more downlink control information (DCI) messages) is detected, the On Duration is extended.

The duration after the UE wakes up (including the On Duration and the extended portion) is called "Active Time" 404.

In New Radio (NR), a wake up signal (WUS) 406 is defined. A UE may monitor for the WUS outside the Active Time. The UE may detect the WUS 406 with relatively simple receiver components, allowing the UE to stay in a reduced power mode (e.g., outside the Active Time). The WUS 406 indicates whether the UE should wake up (more fully) for PDCCH monitoring, such as by activating corresponding receiver components (e.g., a receiver's power amplifier). A person of ordinary skill in the art will understand that activating receiver components in such instances requires additional power expenditures of the UE.

In some cases, a physical downlink control channel (PDCCH) can contain a secondary cell (SCell) dormancy indication (SDI) field. A scheduling entity 108 utilizes a primary cell (PCell) (e.g., a first carrier ('C1')) to transmit the PDCCH to a scheduled entity 106. The scheduled entity 106 may determine, from the SDI of the PDCCH, UE behavior indications for one or more activate SCells (e.g., to stay activate, to switch to provide UE dormancy behavior for the one or more SCells, etc.) and/or for one or more SCells providing UE dormancy behavior with respect to the SCells (e.g., to continue providing UE dormancy behavior for the one or more SCells, or to switch to activate the one or more SCells, etc.). That is, the UE utilizes information received via the PCell to determine when to activate a particular SCell or alternatively, when to provide dormancy behavior for the SCell (e.g., deactivate the SCell).

If Discontinuous Reception (DRX) is configured, there are various scenarios that may occur when transmitting a physical downlink control channel (PDCCH) carrying a secondary cell (SCell) dormancy indication (SDI).

In some examples, a scheduling entity 108 may transmit the PDCCH as a PDCCH wake up signal (WUS) 406. In such scenarios, a scheduled entity 106 may receive the PDCCH WUS 406 outside the Active Time 404. In such examples, the PDCCH (transmitted as the PDCCH WUS 406) may include a secondary cell dormancy indication (SDI). Accordingly, the SDI may indicate a UE behavior. In this way, the SDI may effectively cause the UE to switch its behavior with respect to at least one secondary cell (SCell). In an example, the SDI may indicate a UE behavior, such as dormancy or non-dormancy behavior, relative to one or more SCells, such as for a first SCell, for another SCell, and/or for concurrent behavior across multiple SCells.

In other examples, the PDCCH may additionally schedule data, or the PDCCH may not additionally schedule data. In such examples, a scheduled entity 106 may receive the PDCCH 408 inside the Active Time 404. In some examples, the PDCCH 408 received inside the Active Time may contain an SDI field. In such examples, the SDI field may indicate a UE behavior, such as dormancy or non-dormancy behavior, relative to one or more SCells (e.g., for a first SCell ('C2'), for another SCell ('C3'), for concurrent behavior across multiple SCells (both 'C2' and 'C3' concurrently), etc.).

In instances where DRX is not configured, techniques similar to those described above for a PDCCH received inside the Active Time 404 may be applied. In such examples, the SDI in the PDCCH 408 may indicate a UE behavior (e.g., dormancy or non-dormancy behavior) for each SCell individually. In such examples, a first SDI of PDCCH 408 may indicate a first UE behavior for a first SCell, a second SDI of PDCCH 408 (or a second PDCCH) may indicate a second UE behavior for a second SCell, and so forth.

In some examples, the SDI field may indicate dormancy for a group of SCells (e.g., with the same behavior applied to each SCell in the SCell group). In an example, a first SCell group may include C2 and C3, a second SCell group may include C3 and C4, a third SCell group may include C5 and C6, and so forth. In such examples, an SDI field may indicate a UE behavior for a plurality of SCells of a corresponding SCell group.

In some cases, switching between dormancy behavior and non-dormancy behavior may be realized by bandwidth part (BWP) switching between a dormant BWP and a regular BWP that allows full utilization of the SCell. That is, a UE and/or a corresponding base station (BS) may perform BWP switching to realize the UE behavior related to the corresponding SCell set to utilize the specified BWP to communicate with the UE.

Aspects of the present disclosure provide techniques for handling SCell dormancy indications (SDIs), such as those described above, for when discontinuous reception (DRX) is not configured, or inside an Active Time when DRX is configured, etc. In such examples, the physical downlink control channel (PDCCH) may include one or more field(s) for an SCell dormancy indication (SDI). In an example, a field or fields for SCell dormancy indication (SDI) may be added, at least, to downlink control information (DCI) format 1_1 (e.g., for scheduling downlink (DL) reception (Rx) for the user equipment (UE)). That is, DCI format 1_1 may be a set field to indicate a configuration in which the UE is to utilize when receiving downlink (DL) transmissions. In such examples, the network may include the SDI as part of the DCI format specifying the configuration the UE is to utilize when receiving the DL transmissions. Additionally or alternatively in another example, a field or fields for SCell dormancy indication (SDI) may be added to DCI format 0_1 (e.g., for scheduling uplink (UL) transmission (Tx) for the UE).

If SCell dormancy indication (SDI) fields are added to such DCI formats (e.g., DCI format 1_1, DCI format 0_1, etc.), the PDCCH may indicate UE behavior (e.g., dormancy behavior or non-dormancy behavior) for one SCell or for multiple SCells. In some examples, the PDCCH may indicate a UE behavior (e.g., dormancy behavior or non-dormancy behavior) for one or more SCell groups. In such instances, each SCell group includes at least one SCell and the UE behavior for an SCell group applies to each SCell of that SCell group.

In some examples, a PDCCH may indicate a UE behavior for one or more SCells, in addition to scheduling data, such as by scheduling a physical downlink shared channel (PDSCH) transmission (e.g., for scheduling DL traffic 112 for the UE).

Acknowledgment of Secondary Cell Dormancy Indication

Further aspects of the present disclosure provide techniques for a user equipment (UE) to acknowledge (ACK) the reception of a physical downlink control channel (PDCCH) carrying at least one dormancy indication, such as a secondary cell dormancy indication (SDI). In addition, the present disclosure provides for how the UE may behave regarding secondary cell (SCell) dormancy. That is, the UE may communicate with an SCell using a configurable UE behavior that may transition from a UE dormancy behavior to a UE non-dormancy behavior for power saving considerations.

When a UE receives (e.g., detects) a first downlink control information (DCI) message that carries an SCell dormancy indication (SDI) and that particular DCI message also schedules a physical downlink shared channel (PDSCH) for the primary cell (PCell), there are various possible results.

One result (Result 1) is that the UE does not detect the DCI. In this case, the UE does not successfully receive the secondary cell dormancy indication (SDI) or the physical downlink shared channel (PDSCH). That is, when a scheduled entity 106 fails to properly receive and/or decode correctly a particular DCI from a scheduling entity 108, and that DCI includes an SDI in addition to scheduling data (e.g., a PDSCH), the scheduled entity 106 may, as a result, fail to receive both the SDI and the scheduled data of the PDSCH.

In some examples, another result (Result 2) is that the UE detects the DCI message but fails to successfully receive the physical downlink shared channel (PDSCH) correctly, such as by failing to decode the PDSCH correctly. In such examples, the UE receives the SCell dormancy indication (SDI) but does not receive the PDSCH. This Result 2 may also apply when a particular DCI message includes an SCell dormancy indication (SDI) but does not schedule a PDSCH.

Still another result (Result 3) is that the UE detects the DCI and correctly decodes the PDSCH. In this case, the UE receives both the SCell dormancy indication (SDI) and the PDSCH.

For both the first result (Result 1) and the second result (Result 2), the UE 106 could transmit a HARQ acknowledgment message that includes a negative acknowledgement (NACK) to a scheduling entity 108. In an example, the UE 106 may employ a HARQ-ACK codebook indicating the UE 106 failed to successfully receive the PDSCH. However, the network (e.g., one or more scheduling entities 108), however, may be unable to determine whether the UE 106 sent the NACK due to the UE's failure to decode the DCI message or its failure to decode the PDSCH scheduled by the DCI message. In this case, it is possible that the UE has successfully received (e.g., decoded correctly) the DCI message carrying the SDI and has thus applied the indicated UE behavior (e.g., performed a bandwidth part (BWP) switch based on the SCell dormancy indication (SDI)). However, the network, upon receiving the NACK, may not know whether it then should perform a BWP switch based on the SDI that it sent the UE because the network may not know whether the NACK relates to the DCI or the PDSCH.

Still further aspects of the present disclosure provide techniques for handling each of these possible results by using a HARQ-ACK codebook that incorporates ACK/NACK signals corresponding to successful reception (e.g., successful decoding) of downlink control information (DCI) messages that include SCell dormancy indications (SDIs).

Communication Over Primary Cell Activating Secondary Cell

Figure 5:
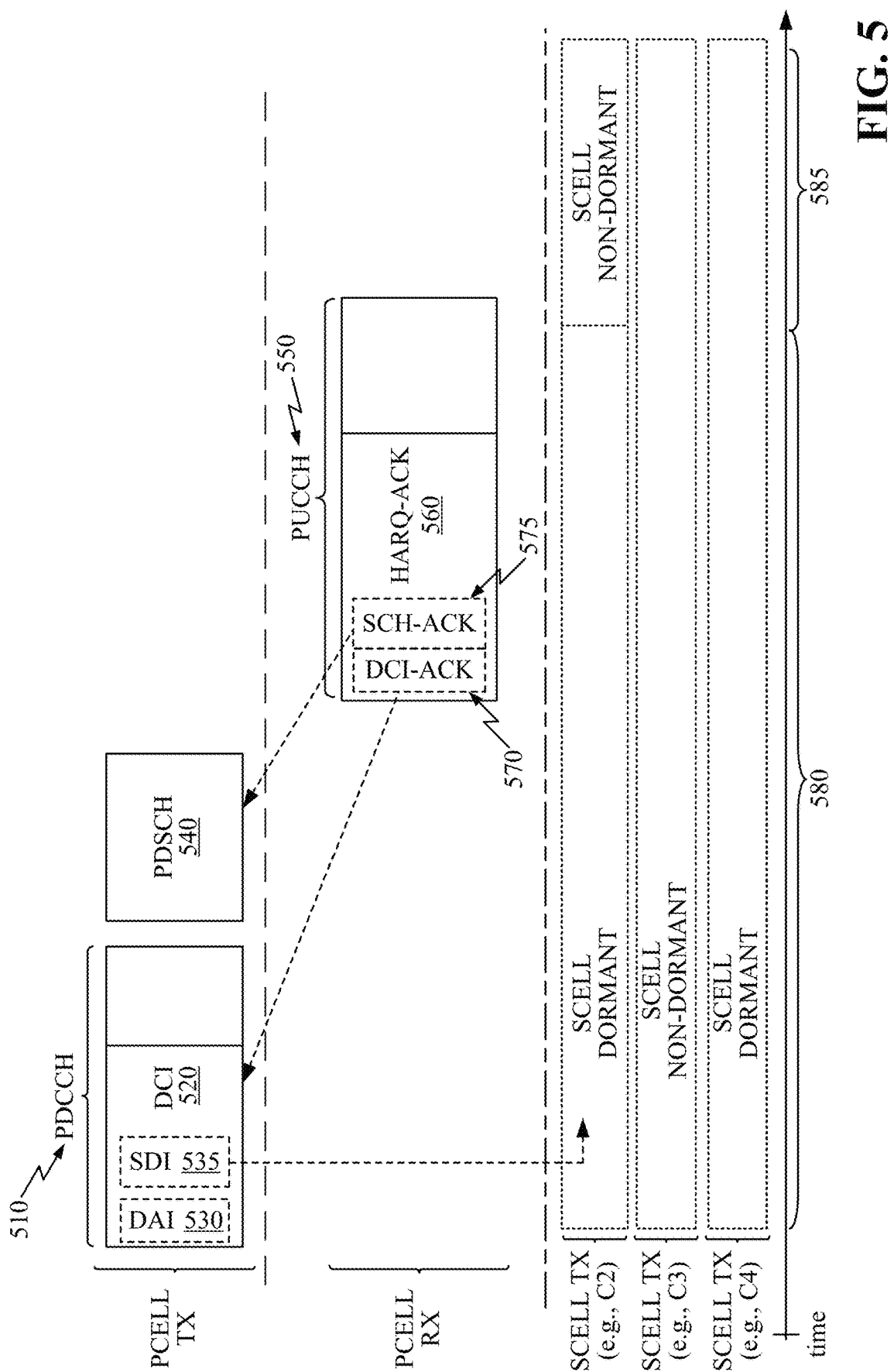
FIG. 5 is a schematic illustration of a primary cell communicating with a scheduled entity that also communicates with a secondary cell scheduled by the primary cell.

As shown in FIG. 5, a base station (BS) (e.g., the BS 108) or other scheduling entity acting as a primary cell (PCell) may communicate with a scheduled entity 106 (e.g., a UE) over resources allocated for communication between the UE and the PCell.

The BS may transmit (Tx) a physical downlink control channel (PDCCH) 510 to the scheduled entity 106. The PDCCH 510 may include (e.g., carry) at least one downlink control information (DCI) message 520.

The DCI message 520 may contain at least one downlink assignment index (DAI) 530 (e.g., a set of DAI values). The DAI 530 may be used to uniquely identify the DCI message 520 and distinguish the DCI message 520 from other DCI messages (e.g., additional DCI messages transmitted by the PCell to the UE 106).

The DCI message 520 may also include a secondary cell (SCell) dormancy indication (SDI) 535. The SDI may indicate, for connections between one or more secondary cells (SCells) and the UE 106, a configurable UE behavior. In an example, the SDI 535 may provide information indicating whether the UE 106 is to treat a connection with the one or more SCells as non-dormant (e.g., active) or as dormant (e.g., inactive).

In the example of FIG. 5, the DCI message 520 may further signal scheduling information for a physical downlink shared channel (PDSCH) 540. In an example, scheduling entity 108 (e.g., via the PCell) may transmit the PDSCH 540 to the UE. In such examples, the DCI message 520 may have scheduled the PDSCH 540 to facilitate delivery of the PDSCH 540 to the UE 106.

The UE 106 may receive (Rx) the PDCCH 510 and the PDSCH 540 (e.g., via the primary cell (PCell)). In an example, the UE 106 may decode an encoded PDCCH 510. The UE 106 may then receive and decode an encoded PDSCH 540, where DCI 510 schedules the PDSCH 540.

The UE may then transmit a PUCCH 550 via the PCell. The PUCCH 550 includes HARQ-ACK information 560 (e.g., a HARQ-ACK message including acknowledgment information). The HARQ-ACK information 560 may include DCI-ACK information 570 that includes one or more bits indicating whether the UE successfully received (e.g., decoded) the DCI message 520 (and thus, the SDI 535). In the example of FIG. 5, the UE receives the SDI 535 during a time period 580 during which the SCell is in a dormant, or some other low-power mode. Here, the SDI 535 indicates that the desired UE behavior for the SCell is a non-dormancy behavior. In such examples, the UE may activate the SCell to facilitate communication between the SCell and the UE. In some examples, the PCell activates the SCell for communicating with the UE over the non-dormant SCell. In such examples, the UE may continue communicating with the PCell in addition to communicating with the non-dormant SCell.

In instances where the UE successfully receives (e.g., decodes correctly) the DCI message 520 containing the SDI 535, the UE may include DCI-ACK information 570 in the HARQ-ACK information 560 transmitted in the PUCCH 550. The UE may transmit the PUCCH 550 following receipt of the PDCCH 510 and in some instances, following receipt of the PDSCH 540. A UE may transmit DCI-ACK information 570 together with shared-channel-acknowledgement (SCH-ACK) information, such as the SCH-ACK information 575 shown in FIG. 5.

In some examples, the UE may then transition to a higher power mode (e.g., a non-dormant mode) to provide non-dormancy behavior for a given SCell during a time period 585 following uplink (UL) transmission of the HARQ-ACK information 560. In such examples, the UE may initiate monitoring for subsequent PDCCHs transmitted via the non-dormant SCell. Accordingly, the base station (BS) may cause the corresponding SCell to enter the non-dormant mode with respect to the UE during a time period 585 following receipt of the HARQ-ACK information 560.

In various examples, a UE can encode DCI-ACK information 570 using any suitable hybrid automatic repeat request acknowledgment (HARQ-ACK) codebook. In an example, a UE may utilize a semi-static HARQ-ACK codebook (e.g., a Type-1 codebook) to encode DCI-ACK information 570. Additionally or alternatively, in another example, a UE may utilize a dynamic HARQ-ACK codebook (e.g., a Type-2 codebook) to encode DCI-ACK information 570.

Utilizing Codebooks to Format Acknowledgments

For dynamic HARQ-ACK codebooks, the location of the DCI-ACK information may be specified using one or more configuration mechanisms. In an illustrative and non-limiting example, a first configuration for a dynamic HARQ-ACK codebook may specify that DCI-ACK information precedes SCH-ACK information. Similarly, a second configuration for a dynamic HARQ-ACK codebook may specify that SCH-ACK information precedes DCI-ACK information. In this way, a scheduled entity 106 and a scheduling entity 108 may be able to arrange, in a HARQ-ACK message, DCI-ACK information and SCH-ACK information according to the configuration mechanisms to facilitate effective wireless communication between entities.

In some examples, as indicated above, the DCI messages transmitted by the base station (BS) may contain downlink assignment index (DAI) parameters, such as the DAI 530 described with reference to FIG. 5 for example.

A DAI parameter may include a counter DAI value and a total DAI value. When the DAI parameter contains a counter DAI value and/or a total DAI value, a UE may utilize the DAI parameter to distinguish a first DCI message containing an SDI from a second DCI message that does not include an SDI. In an example, the second DCI message may schedule a PDSCH for the PCell and omit an SCell dormancy indication (SDI).

In an example, a UE may detect a discontinuity of counter DAI values in DCI messages received in the slot (e.g., a first time interval, a first subslot, a second time interval, a second subslot, a third slot, a third time interval, etc.). In such examples, the UE may infer from the discontinuity that it did not receive one or more of the DCI messages transmitted by the network.

In another example, in instances where the UE does not detect a DAI value equal to the total DAI value in any DCI in a given time interval, the UE may infer that it did not successfully receive the last one or more DCI messages transmitted by the network.

If the UE detects two missing counter DAI values, the UE may infer that either two regular DL scheduling DCI messages were not received successfully or that a DCI message carrying an SDI was not received successfully. This is because the counter DAI values are counted twice (e.g., once for the DCI-ACK and again for the corresponding SCH-ACK). The network (e.g., the base station (BS)) has sufficient information to determine which event occurred and can respond appropriately.

Various configurations of HARQ-ACK information may be employed according to the examples disclosed herein. As a non-limiting example, a HARQ-ACK message may include a single ACK/NACK corresponding to the physical downlink control channel (PDCCH), and a single ACK/NACK corresponding to a single transport block (TB) of PCell physical downlink shared channel (PDSCH) data. In another non-limiting example, a HARQ-ACK message may include a single ACK/NACK corresponding to the PDCCH, and multiple ACK/NACKs corresponding to multiple transport blocks (TBs), (and/or multiple code block groups (CBGs) contained within one or more TBs) of PCell PDSCH data.

In some examples, a HARQ-ACK message may only include the DCI-ACK information and the SCH-ACK information corresponding to the PDSCH transmitted via the PCell (as in above examples). In such examples, the scheduled entity 106 may generate the HARQ-ACK message to include: the DCI-ACK information corresponding to one or more PDCCHs successfully received via the PCell, and the SCH-ACK information corresponding to: PDSCH(s) received via the PCell, and in addition, PDSCH(s) received via one or more SCells. The addition of DCI-ACK information (such as the DCI-ACK information 570 in FIG. 5), however, can introduce additional overhead over systems that only send conventional shared-channel-acknowledgement (SCH-ACK) information.

Where each DCI message can schedule a physical downlink shared channel (PDSCH) and/or transmit a secondary cell (SCell) dormancy indication (SDI), and where the UE is not aware in advance of which DCI message(s) include SCell dormancy indications (SDIs), the UE may be configured to use a semi-static HARQ-ACK codebook that specifies time intervals during which the UE may receive PDSCH transmissions. With the semi-static codebook, a UE is configured to transmit HARQ-ACK information based on all potential PDSCH transmissions (e.g., PDSCH occasions, monitoring occasions, etc.) according to the entire time domain resource allocation for the semi-static HARQ-ACK codebook period.

According to an aspect of the present disclosure, in this scenario, the UE may be further configured to transmit DCI-ACK information indicating whether a DCI message corresponding to each potential PDSCH transmission was received, along with SCH-ACK information indicating whether a PDSCH was received during each time interval (e.g., $t_1$, $t_2$, $t_3$), as illustrated in FIG. 6. That is, FIG. 6 shows expected SCH-ACK transmissions 604 according to a semi-static HARQ-ACK codebook 600 for four carriers or cells (e.g., 'Carrier 1' or 'C1'; 'Carrier 2' or 'C2'; 'Carrier 3' or 'C3'; and 'Carrier 4' or 'C4'). In this illustrative and non-limiting example, the semi-static HARQ-ACK codebook 600 spans three time intervals ($t_1$, $t_2$, $t_3$) for its semi-static HARQ-ACK codebook period 602. In such examples, a UE may include at least one DCI-ACK bit in connection with each of the illustrated SCH-ACK transmissions 655. In an example, the ACK transmitted during $t_1$ via Carrier 1 (C1) may correspond to the HARQ-ACK information 560 where 'Carrier 1' is a primary cell (PCell) for facilitating primary wireless communication with the UE. In such instances, 'Carrier 2' through 'Carrier 4' are non-dormant or activate secondary cells (SCells) for facilitating wireless communication with the UE using carrier aggregation.

In such examples, the UE may receive a secondary cell indication (SDI) during period 602. In an example, the PCell (e.g., Carrier 1) may carry one or more PDCCHs including the SDI and/or multiple SDIs. The SDI may indicate a UE behavior for one or more secondary serving cells (e.g., with respect to Carrier 2, Carrier 3, and/or Carrier 4). In an example, the SDI may indicate the UE is to transition from non-dormancy behavior to dormancy behavior for one or more of the secondary serving cells indicated via the SDI. In this way, the UE may transition to the proper behavior in a subsequent time period following the PUCCH 650. In an example, the SDI may indicate that the UE is to transition from non-dormancy behavior to dormancy behavior relative to 'Carrier 3.'

Accordingly, the UE may continue monitoring for DL transmissions via Carrier 1, Carrier 2, and Carrier 4, and may discontinue monitoring for DL transmissions during one or more codebook periods. In doing so, the UE may conserve power resources compared to instances where the UE monitors for DL transmissions on the four carriers. This is because the UE consumes power when monitoring for DL transmissions on any given carrier In an example, the UE may perform channel state information (CSI) measurements for each activate serving cell to manage mobility. The UE may do so for each secondary cell (SCell) corresponding to an appropriate radio resource control (RRC) configuration (e.g., a connected RRC for a first activate cell, an idle RRC configuration for a second dormant cell, etc.). In such examples, the UE may modify RRC configurations in accordance with a given SDI to effectuate the UE behavior (e.g., dormancy behavior, non-dormancy behavior) relative to a given SCell.

In the example of FIG. 6, the scheduled entity 106 (e.g., the user equipment (UE)) transmits a physical uplink control channel (PUCCH) in an uplink (UL) slot 606 (following the seven PDSCH transmissions). In an illustrative and non-limiting example, the PUCCH 650 includes four DCI-ACKs corresponding to the carrier and time interval combinations where the UE successfully received a PDSCH transmission, such as the PDSCH transmission 604 received via the primary cell (PCell). In addition, the PUCCH 650, in this example, includes a first set of three NACKs and a second set of five NACKs to indicate where the UE did not receive a PDSCH for various reasons.

In the example of FIG. 6, an 'X' 612 is shown where a PDSCH was transmitted to the UE but was not received successfully by the UE. The PUCCH 650 may include NACKs for DCIs and/or for PDSCHs that the UE did not receive successfully (e.g., decode correctly). The PUCCH 650 may also include NACKs for PDSCH monitoring occasions during which a BS did not transmit any PDSCH (e.g., the empty box 614 for 'Carrier 3' at time interval '$t_1$').

In examples such as the one described above (e.g., where a UE is configured to transmit a DCI-ACK along with each SCH-ACK transmission), the HARQ-ACK overhead for the physical uplink control channel (PUCCH) may tend to increase (e.g., over other techniques that do not include transmitting DCI-ACK information along with SCH-ACK transmissions). That is, each physical downlink shared channel (PDSCH) occasion may result in multiple ACK/NACK bits. In an illustrative example, each PDSCH occasion may result in at least one bit of SCH-ACK data, but may additionally result in at least one bit of DCI-ACK data.

This additional overhead may be reduced, however, when scheduled entities and scheduling entities utilize appropriate HARQ-ACK codebooks and/or other techniques that reduce the volume of DCI-ACK bits that a UE is configured to transmit over time.

In some examples, a primary cell (PCell) provides a UE in carrier aggregation with one or more secondary cell dormancy indications (SDIs) (e.g., indicating a transition of a given secondary cell (SCell) from a dormant mode to an active mode or vice versa). In such examples, a HARQ-ACK codebook may specify that a UE is only to include DCI-ACK information with SCH-ACK information corresponding to PDSCH occasions on the PCell. Here, the PCell is used to send SCell dormancy indications (SDIs), such as the SDI 535 described with reference to FIG. 5. In such examples, the UE may forgo monitoring SCell communications until a wake-up signal or other equivalent SDI is received via the PCell. Accordingly, the UE transmits DCI-ACK information for DCI carried by the PCell while forgoing monitoring any dormant SCells.

Acknowledgment Bit Allocations

In some examples, it may not be necessary for a UE to generate DCI-ACK information with every PDSCH occasion on the PCell. In such examples, the additional overhead introduced by sending DCI-ACK information may be reduced.

In an example, the UE may be configured to use a semi-static codebook (e.g., the semi-static HARQ-ACK codebook 600) that causes the UE to send only a single ACK/NACK indicating whether at least one DCI (e.g., a DCI message with an SDI) has been correctly received and decoded during a predetermined time interval. This time interval may be equivalent to the length of a single slot, a subslot, a half-slot, a mini-slot, or any other suitable time interval.

In an illustrative example, a base station (BS) may transmit, to a user equipment (UE), one DCI message (e.g., a DCI message with an SDI) during a predetermined time interval. In such examples, the UE may be configured to transmit one DCI-acknowledgment (DCI-ACK) bit for a HARQ-ACK message transmitted for that time interval.

In another example, a base station (BS) may be configured to include the same secondary cell dormancy indication (SDI) in each of a plurality of DCI messages transmitted during the predetermined time interval. In such examples, a user equipment (UE) may receive one of the plurality of DCI messages and successfully respond to the desired UE behavior indicated by the SDI. In such examples, the UE may include a single DCI-ACK bit for a HARQ-ACK message transmitted for that time interval.

Figure 8:
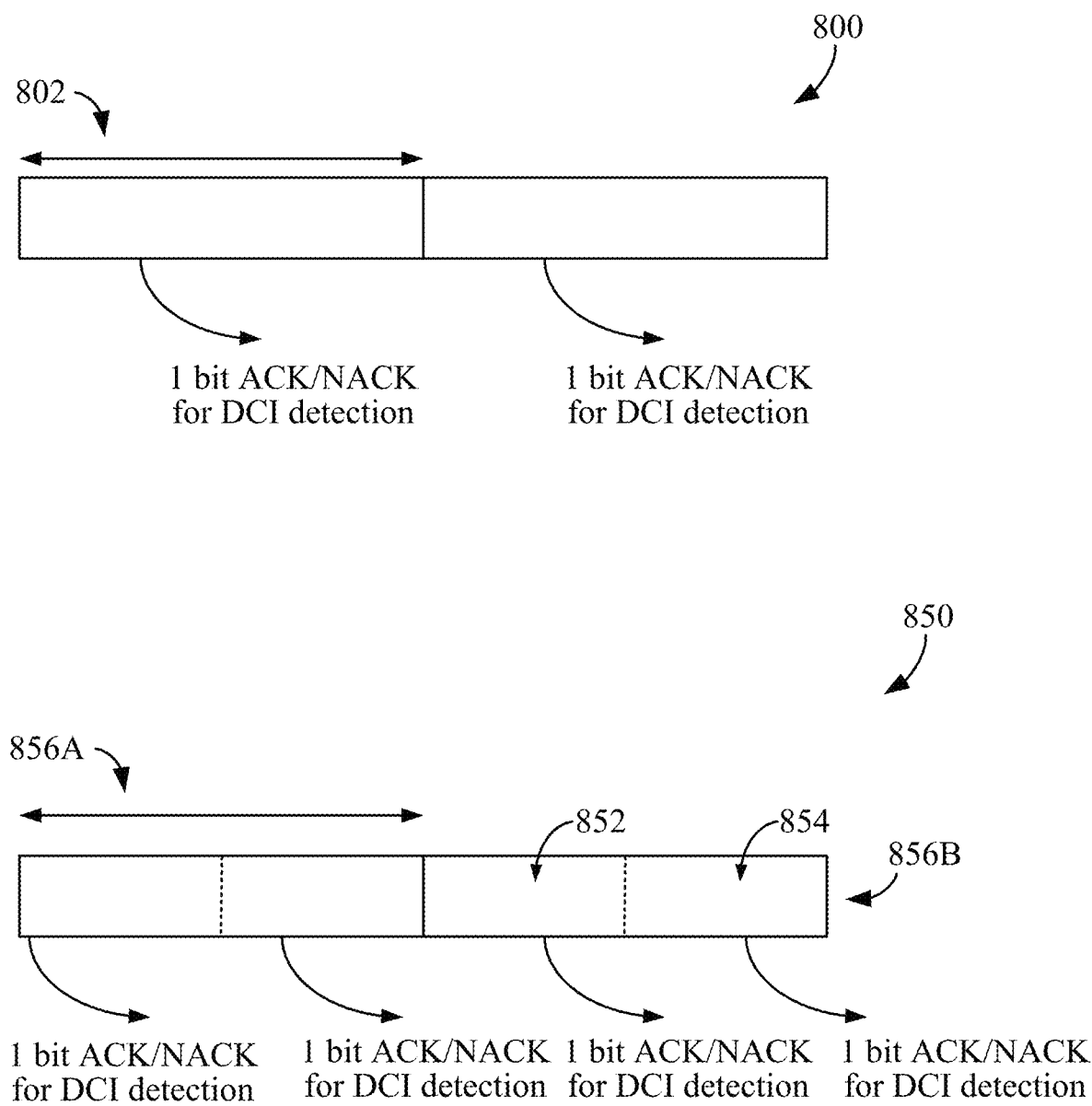
FIG. 8 is a schematic illustrating elements of DCI-ACK transmission according to examples herein.

FIG. 8 illustrates a first example 800 where a codebook allocates one bit for DCI-ACK per slot 802 (e.g., one bit per slot).

In some examples, the HARQ-ACK information for a single time interval may contain multiple DCI-ACK bits. FIG. 8 illustrates a second example 850 where a codebook allocates one bit for DCI-ACK for each subslot per slot 856A (e.g., two bits per slot).

In such examples, each DCI-ACK bit may indicate whether a DCI message was received within a particular portion of that time interval. For example, HARQ-ACK information for a single slot 856B may have a first DCI-ACK bit indicating whether at least one DCI message was received within a first subslot 852 of the single slot 856B, and a second DCI-ACK bit indicating whether at least one DCI message was received within a second subslot 854 of the single slot 856B.

Scheduling Entity

Figure 9:
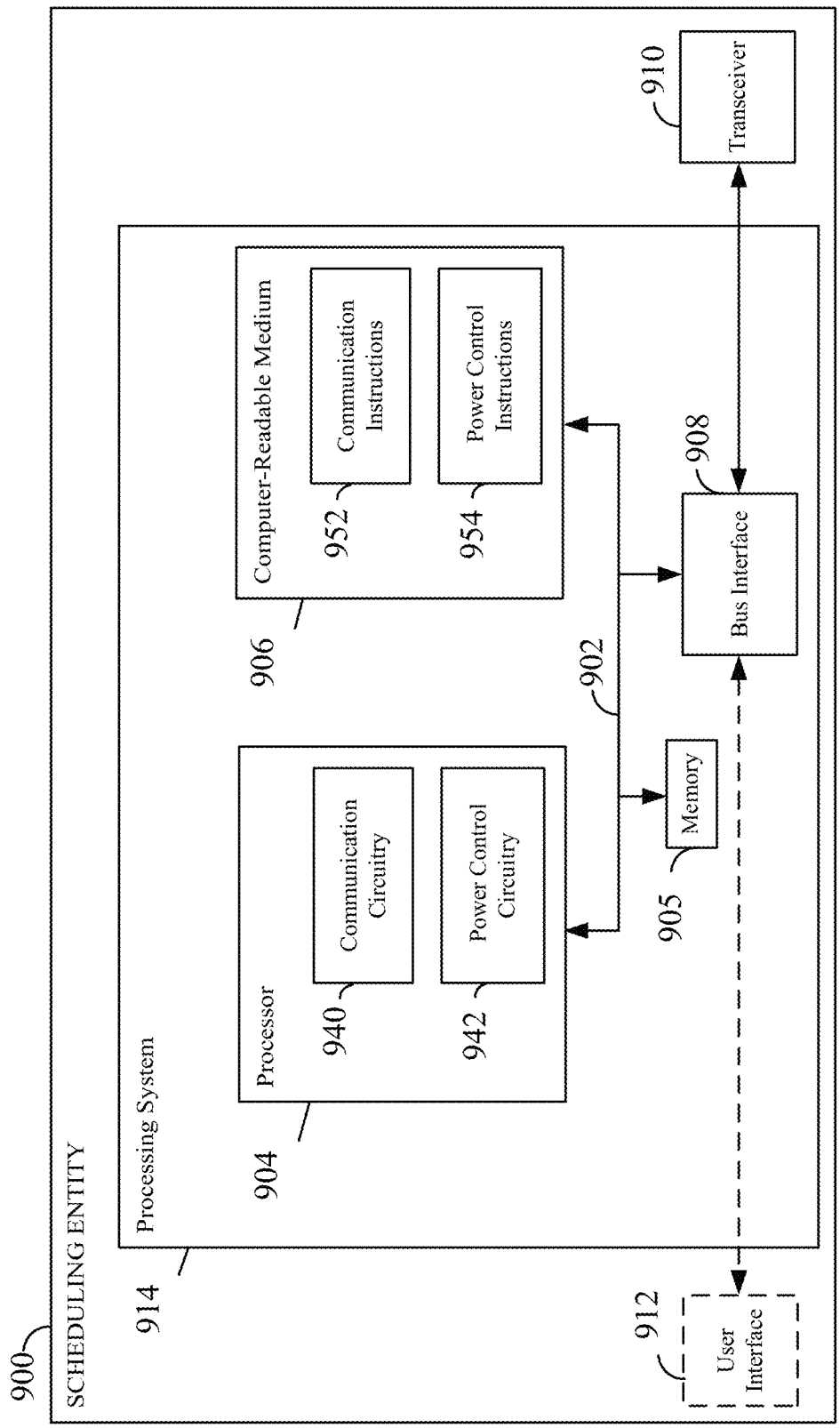
FIG. 9 is a block diagram conceptually illustrating an example of a hardware implementation for a scheduling entity according to some embodiments.

FIG. 9 is a block diagram conceptually illustrating an example of a hardware implementation for a scheduling entity 900 employing a processing system 914. For example, the scheduling entity 900 may be a base station (e.g., a base station 108) as illustrated in any one or more of FIGS. 1, 2, and/or 3. In another example, the scheduling entity 900 may be a base station as illustrated in any one or more of FIGS. 1, 2, and/or 3.

The scheduling entity 900 includes a processing system 914 having one or more processors 904. Examples of processors 904 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the scheduling entity 900 may be configured to perform any one or more of the functions described herein. That is, the processor 904, as utilized in a scheduling entity 900, may be configured (e.g., in coordination with the memory 905 and the transceiver 910) to implement any one or more of the processes and procedures described herein and illustrated in FIG. 11.

The processing system 914 may be implemented with a bus architecture, represented generally by the bus 902. The bus 902 may include any number of interconnecting buses and bridges depending on the specific application of the processing system 914 and the overall design constraints. The bus 902 communicatively couples together various circuits including one or more processors (represented generally by the processor 904), a memory 905, and computer-readable media (represented generally by the computer-readable medium 906). The bus 902 may also link various other circuits such as timing sources, peripherals, voltage regulators, and power management circuits, which are well known in the art, and therefore, will not be described any further. A bus interface 908 provides an interface between the bus 902 and a transceiver 910. The transceiver 910 provides a communication interface or means for communicating with various other apparatus over a transmission medium. Depending upon the nature of the apparatus, a user interface 912 (e.g., keypad, display, speaker, microphone, joystick) may also be provided. Of course, such a user interface 912 is optional, and some examples, such as a base station (BS), may omit it.

In some aspects of the disclosure, the processor 904 may include communication circuitry 940 configured (e.g., in coordination with the memory 905 and/or the transceiver 910) for various functions, including, e.g., communicating with one or more UEs according to a suitable communication standard or protocol as described herein. For example, the communication circuitry 940 may be configured to implement one or more of the functions described below in relation to FIG. 11.

Figure 11:
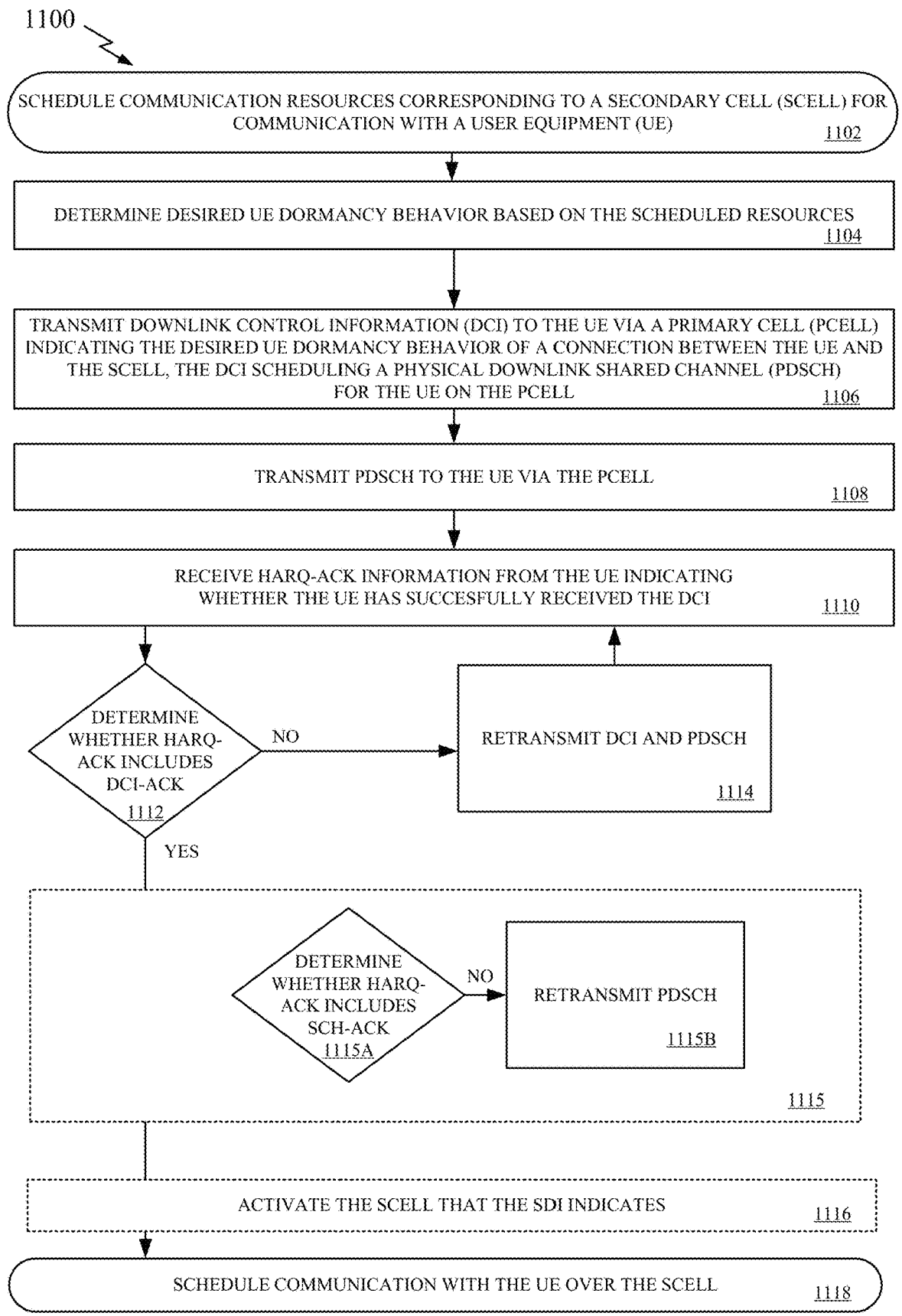
FIG. 11 is a flow chart illustrating an exemplary process usable by a scheduling entity acting as primary cell to communicate with a scheduled entity that also communicates with a secondary cell scheduled by the primary cell according to some embodiments.

The processor 904 may further include power control circuitry 942 configured (e.g., in coordination with the memory 905 and the transceiver 910) for various functions, including, e.g., generating signals indicating to a UE that the UE may operate in a reduced power mode, and/or that the UE should operate in a higher power mode, as appropriate (e.g., as shown in block 1116 of FIG. 11). In some examples, the power control circuitry 942 may also be configured to transition portions of the communication circuitry 940 between dormant (lower power consumption) and active (higher power consumption) mode.

The processor 904 is responsible for managing the bus 902 and general processing, including the execution of software stored on the computer-readable medium 906. The software, when executed by the processor 904, causes the processing system 914 to perform the various functions described herein for any particular apparatus. The processor 904 may also use the computer-readable medium 906 and the memory 905 for storing data that the processor 904 manipulates when executing software.

One or more processors 904 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 906. The computer-readable medium 906 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 906 may reside in the processing system 914, external to the processing system 914, or distributed across multiple entities including the processing system 914. The computer-readable medium 906 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In one or more examples, the computer-readable storage medium 906 may store computer-executable code that includes communication instructions 952 that configure a scheduling entity 900 for various functions, including, e.g., communicating with UEs according to communication methods described herein. For example, the communication instructions 952 may be configured to cause a scheduling entity 900 to implement one or more of the functions described below in relation to FIG. 11, including, e.g., blocks 1106-1112 and 1116-1120. The communication instructions 952 may be further configured to cause the scheduling entity 900 to operate the power control circuitry 954. The power control instructions 954 may be configured to cause a scheduling entity 900 to implement one or more of the functions described below in relation to FIG. 11, including, e.g., block 1114.

In one configuration, the scheduling entity 900 for wireless communication includes means for transmitting, via a primary cell (PCell), downlink control information (DCI) (e.g., the DCI message 520) that includes a desired UE dormancy behavior for a secondary cell (SCell) (e.g., the SDI 550), and means for receiving HARQ-ACK information indicating whether a scheduled entity such as a UE successfully received that DCI. In one aspect, the aforementioned means may be the processor(s) 904 shown in FIG. 9 configured to perform the functions recited by the aforementioned means. In another aspect, the aforementioned means may be a circuit or any apparatus configured to perform the functions recited by the aforementioned means.

Of course, in the above examples, the circuitry included in the processor 904 is merely provided as an example, and other means for carrying out the described functions may be included within various aspects of the present disclosure, including but not limited to the instructions stored in the computer-readable storage medium 906, or any other suitable apparatus or means described in any one of the FIGS. 1, 2, and/or 3, and utilizing, for example, the processes and/or algorithms described herein in relation to FIG. 11.

Scheduled Entity

Figure 10:
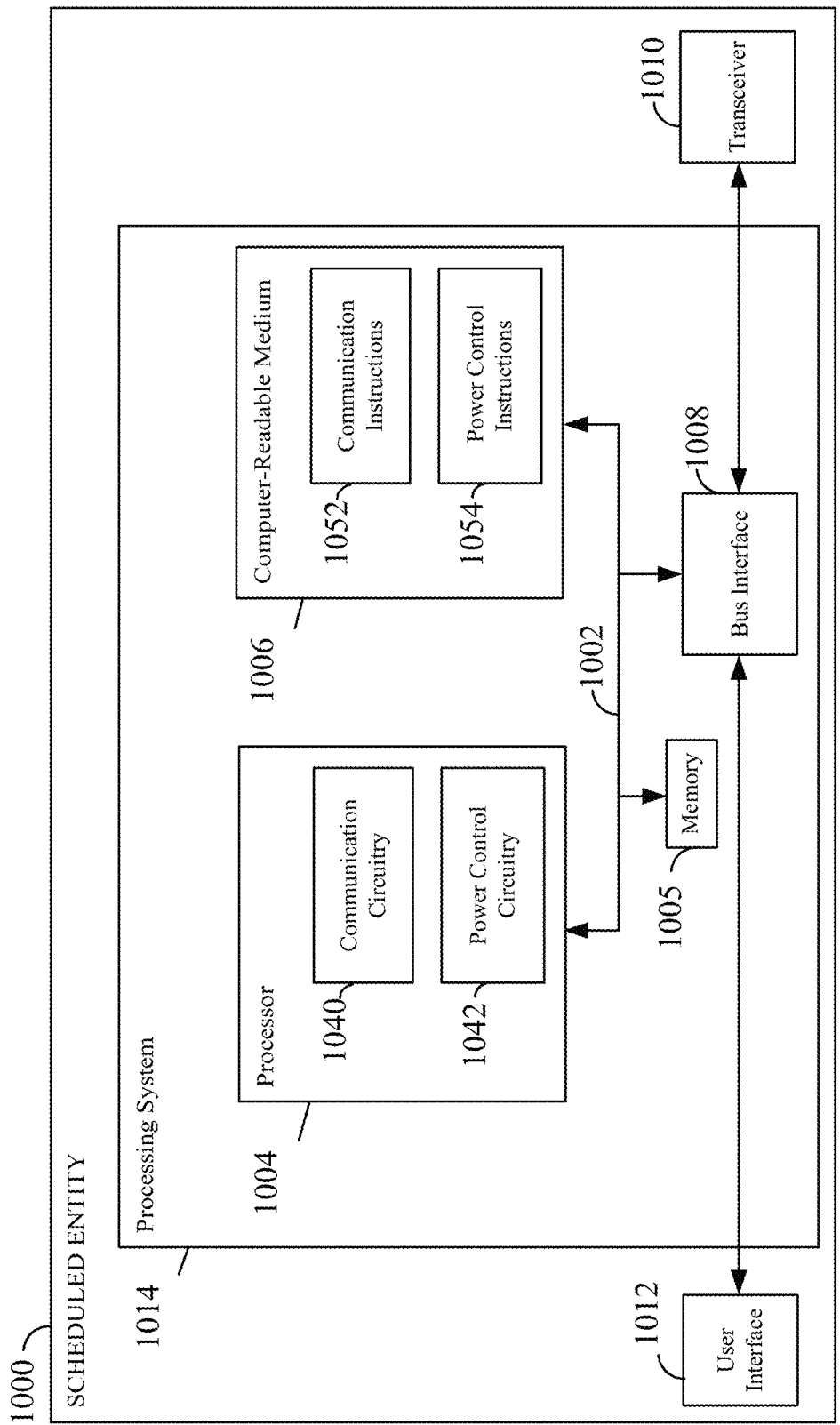
FIG. 10 is a block diagram conceptually illustrating an example of a hardware implementation for a scheduled entity according to some embodiments.

FIG. 10 is a block diagram conceptually illustrating an example of a hardware implementation for an exemplary scheduled entity 1000 employing a processing system 1014. In accordance with various aspects of the disclosure, the processing system 1014 may include an element, or any portion of an element, or any combination of elements having one or more processors 1004. The scheduled entity 1000 may be a user equipment (UE) as illustrated in any one or more of FIGS. 1, 2, and/or 3.

The processing system 1014 may be substantially the same as the processing system 914 illustrated in FIG. 9, including a bus interface 1008, a bus 1002, memory 1005, a processor 1004, and a computer-readable medium 1006. Furthermore, the scheduled entity 1000 may include a user interface 1012 and a transceiver 1010 substantially similar to those described with reference to FIG. 9. That is, the processor 1004, as utilized in a scheduled entity 1000, may be configured used to implement any one or more of the processes described herein with reference, for example, to FIG. 12.

In some aspects, the processor 1004 may further include communication circuitry 1040 configured (e.g., in coordination with the memory 1005 and/or transceiver 1010) for various functions, including, for example, communicating according to a suitable standard or protocol, as described herein. For example, the communication circuitry 1040 may be configured to implement one or more of the functions described below in relation to FIG. 12 including, e.g., blocks 1202-1216. In some aspects of the disclosure, the processor 1004 may include power control circuitry 1042 configured (e.g., in coordination with the memory 1005 and the communication circuitry 1040) for various functions, including, for example, managing power consumption of portions of the communication circuitry 1040 and/or transceiver 1010. For example, the power control circuitry 1042 may be configured to implement one or more of the functions in cooperation with the communication circuitry 1040 as described below in relation to FIG. 12 including, e.g., blocks 1210A and 1210B.

And further, the computer-readable storage medium 1006 may store computer-executable code that includes communication instructions 1052 that configure a scheduled entity 1000 for various functions, including, e.g., communicating according to methods described herein. For example, the communication instructions 1052 may be configured to cause a scheduled entity 1000 to implement one or more of the functions described below in relation to FIG. 12 including, e.g., blocks 1202-1216. In some aspects of the disclosure, the instructions 1006 may include power control instructions 1054 configured (e.g., in coordination with the memory 1005 and the communication instructions 1052) that configure a scheduled entity 1000 for various functions, including, e.g., managing power consumption of portions of the communication circuitry 1040. For example, the power control instructions 1054 may be configured to implement one or more of the functions in cooperation with the communication circuitry 1040 as described below in relation to FIG. 12 including, e.g., blocks 1210A and 1210B.

In one configuration, the scheduled entity 1000 for wireless communication includes means for receiving, via a primary cell (PCell), downlink control information (DCI) (e.g., a DCI message 520) indicating a UE behavior of a secondary cell (SCell) (e.g., SDI 535), and means for transmitting HARQ-ACK information (e.g., DCI-ACK information 570) indicating whether the scheduled entity 1000 successfully received the DCI. In one aspect, the aforementioned means may be the processor(s) 1004 shown in FIG. 11 configured to perform the functions recited by the aforementioned means. In another aspect, the aforementioned means may be a circuit or any apparatus configured to perform the functions recited by the aforementioned means.

Figure 12:
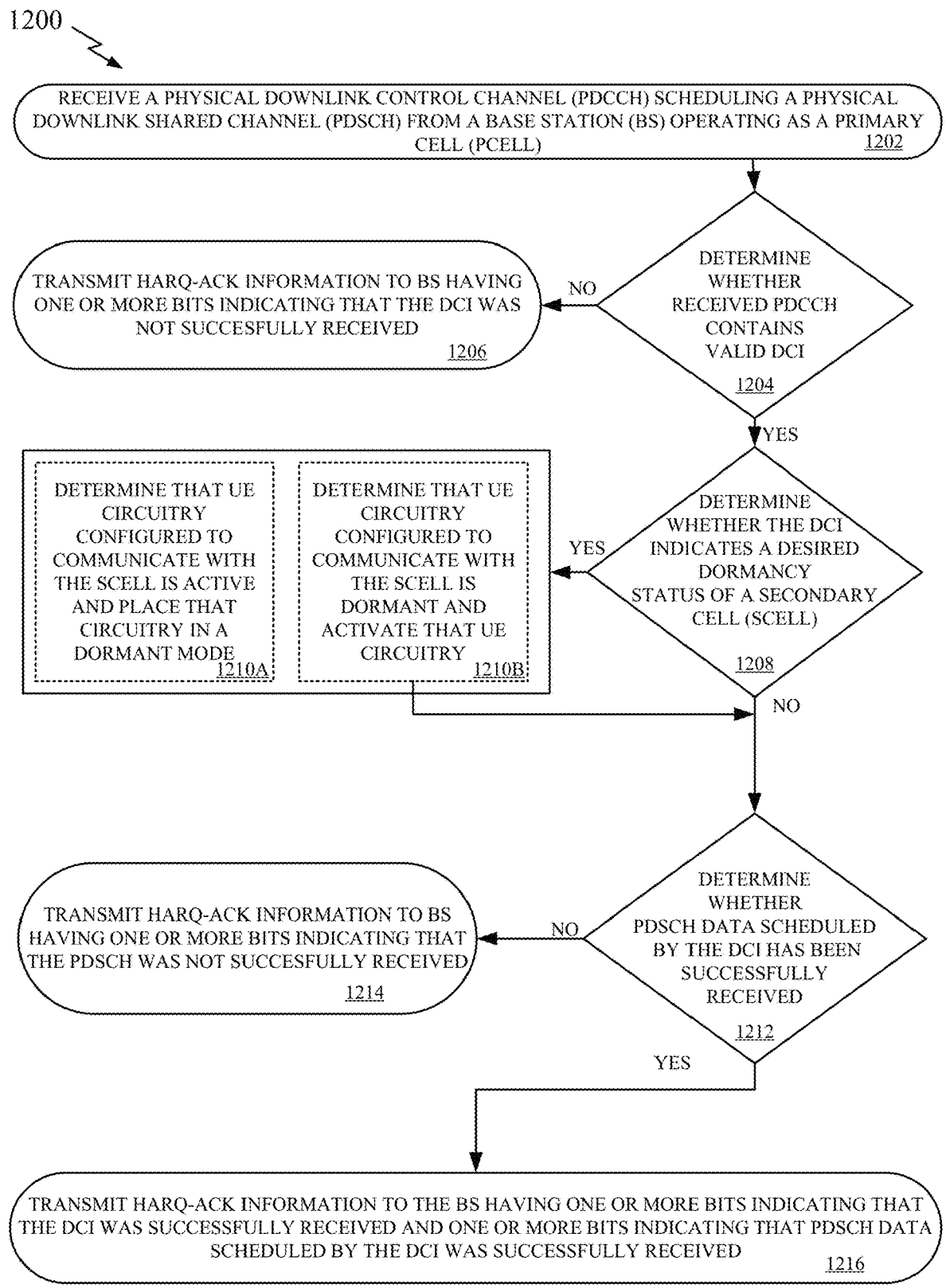
FIG. 12 is a flow chart illustrating an exemplary process usable by a scheduled entity to communicate with a scheduling entity acting as a primary cell that schedules communication between the scheduled entity and a secondary cell according to some embodiments.

Of course, in the above examples, circuitry included in the processor 1004 is merely provided as an example, and other means for carrying out the described functions may be included within various aspects of the present disclosure, including but not limited to the instructions stored in the computer-readable storage medium 1006, or any other suitable apparatus or means described in any one of the FIGS. 1, 2, and/or 3, and utilizing the example processes and/or techniques described herein, for example, with reference to FIG. 12.

Network Communicating Dormancy Behavior to Scheduled Entity

FIG. 11 is a flow chart illustrating an exemplary process 1100 for managing wireless communication between a scheduling entity (e.g., a base station (BS)) and a scheduled entity in accordance with some aspects of the present disclosure. As described below, some or all illustrated features may be omitted in a particular implementation within the scope of the present disclosure, and some illustrated features may not be required for implementation of all embodiments. In some examples, the process 1100 may be carried out by the scheduling entity 900 illustrated in FIG. 9. In some examples, any suitable apparatus or means for carrying out the functions or algorithm described herein may carry out the process 1100.

At block 1102, a processor belonging to a scheduling entity (e.g., the processor 904 of the scheduling entity 900) may schedule communication resources corresponding to a secondary cell (SCell) for communication with a user equipment (UE) or other scheduled entity. For example, the processor may determine whether to activate the S Cell to facilitate communicating downlink (DL) transmissions with the UE.

At block 1104, the processor may determine a UE behavior (e.g., a desired dormancy status, UE dormancy behavior, non-dormancy behavior, etc.) for a particular SCell. For example, the processor may determine that an SCell that is currently dormant (or otherwise in a low-activity mode with respect to the UE) should be placed in an active mode with respect to that UE. Alternatively, the processor may determine that an SCell currently configured to operate in an active mode with respect to the UE is no longer needed to communicate with the UE and should be configured to operate in a dormant mode or other low-activity mode.

At block 1106, communication circuitry (e.g., the communication circuitry 640) of the processor, acting as a primary cell (PCell), may transmit downlink control information (DCI) to the UE. The DCI may include one or more secondary cell dormancy indications (SDIs). An SDI indicates the UE behavior that the PCell desires for the UE relative to one or more SCells. The indicated UE behavior (e.g., dormancy or non-dormancy behavior) is set to govern a connection between the UE and at least one SCell (e.g., a dormancy or non-dormancy behavior for the UE relative to the at least one SCell). In addition, the DCI may schedule transmission of a physical downlink shared channel (PDSCH) to the UE via the PCell.

At block 1108, the communication circuitry may transmit the PDSCH to the UE via the PCell.

At block 1110, after transmission of the PDSCH, the processor may use the communication circuitry to receive hybrid automatic repeat request acknowledgment (HARQ-ACK) information from the UE (e.g., a HARQ-ACK message). In such examples, the HARQ-ACK information may indicate whether the UE successfully received and/or decoded the DCI. In an example, a HARQ-ACK message may include DCI-ACK information (e.g., DCI-ACK information 570). In another example, the HARQ-ACK message may include SCH-ACK information (e.g., SCH-ACK information 575). In some examples, the UE may format the HARQ-ACK message according to one or more HARQ-ACK codebook formats. In such examples, the processor may execute instructions for extracting the DCI-ACK information and the SCH-ACK information from the HARQ-ACK message (e.g., from a single HARQ-ACK message). The process may do so where the HARQ-ACK message is formatted according to one or more HARQ-ACK codebook formats stored in memory of the processor.

At block 1112, the processor may determine, from the HARQ-ACK message, whether the UE successfully received and decoded the DCI.

If the HARQ-ACK message indicates the UE did not successfully receive and/or decode the DCI (NO at block 1112), the processor may proceed to block 1114.

At block 1114, the processor may use the communication circuitry to retransmit the DCI and PDSCH before returning to block 1110.

If the HARQ-ACK indicates the UE did successfully receive and decode the DCI (YES at block 1112), the processor may optionally proceed to block 1115A and/or block 1116. In some examples, the processor may execute block 1116 in parallel with block 1115A and/or in parallel with block 1115B.

At block 1115A, the processor may determine, from the HARQ-ACK message, whether the UE successfully received and decoded the PDSCH.

In instances where the HARQ-ACK information indicates that the UE did not successfully receive (e.g., decode correctly) the PDSCH (NO at block 1115A), the processor may proceed to block 1115B. In instances where the HARQ-ACK information indicates that the UE received (e.g., decoded correctly) the PDSCH (YES at block 1115A), the may proceed to block 1118 and/or may proceed optionally to block 1116.

At block 1115B, the processor may retransmit the PDSCH using the communication circuitry, e.g., by employing a suitable HARQ retransmission protocol as described above. It should be noted that while the present disclosure uses a PDSCH as an illustrative example, the techniques of this disclosure are not so limited, and a person of ordinary skill in the art would understand that the disclosed techniques may be used for sidelink (SL) communications as well (e.g., physical sidelink shared channel (PSSCH), sidelink control information (SCI), physical sidelink control channel (PSCCH), etc.).

At block 1116, if the SCell is in a dormant mode, and the secondary cell dormancy indication (SDI) included in the DCI message indicates an active mode, the processor may transition the SCell to regular operations (e.g., operations according to RRC bandwidth part (BWP) configuration). This may include, for example, enabling physical downlink control channel (PDCCH) transmissions to the UE via the SCell.

At block 1118, the processor may schedule communication with the UE via the activate SCell and may use the communication circuitry to communicate scheduling information to the UE (e.g., via PDCCH and/or PUCCH transmissions).

User Equipment Receiving Secondary Cell Dormancy Indication

FIG. 12 is a flow chart illustrating an exemplary process 1200 for managing wireless communication between a scheduling entity (e.g., a base station (BS)) and a scheduled entity (e.g., a user equipment (UE)) in accordance with some aspects of the present disclosure. As described herein, a particular implementation may omit some or all features, and may not require some illustrated features to implement all embodiments. In some examples, the process 1200 may be carried out by the scheduled entity 1000 illustrated in FIG. 10. In some examples, any suitable apparatus or means for carrying out the functions or algorithm described herein may carry out the process 1200.

At block 1202, a processor (e.g., the processor 1004) of a UE or other scheduled entity may use communication circuitry (e.g., the communication circuitry 1040) to receive (e.g., decode) a physical downlink control channel (PDCCH; e.g., the PDCCH 510) that schedules a physical downlink shared channel (PDSCH; e.g., the PDSCH 540) from a scheduling entity such as a base station acting as a primary cell (PCell) (a BS in this example).

At block 1204, the processor may determine whether the PDCCH contains a valid DCI message (e.g., the DCI message 520). In an example, the processor may determine a cyclic redundancy check (CRC) based on the received PDCCH, and compare the determined CRC to a CRC received in association with the PDCCH.

If the received PDCCH does not contain a valid DCI message (e.g., due to a transmission error, etc.) (NO at block 1204), the processor may proceed to block 1206.

Alternatively, if the PDCCH (as received) contains a valid DCI message (YES at block 1204), the processor may proceed to block 1208.

At block 1206, the processor may use the communication circuitry to transmit a HARQ-ACK message (e.g., the HARQ-ACK information 560) to the BS. The processor may transmit the HARQ-ACK message to the BS via the PCell. In such examples, the HARQ-ACK message may include one or more bits indicating the UE failed to receive the DCI. In an example, the HARQ-ACK message may include a DCI-ACK such as the DCI-ACK information 570. In such instances, the DCI-ACK information may include a negative acknowledgment (NACK) indicating the UE failed to receive the DCI. In some examples, a UE can miss receiving any particular DCI due to a transmission error, a decoding error, and so forth.

In some examples, the HARQ-ACK message may further include one or more bits indicating the UE failed to receive one or more PDSCHs. The missed PDSCH(s) may have been scheduled by the missed DCI. In an example, the HARQ-ACK message may include a SCH-ACK such as the SCH-ACK information 575. In such instances, the SCH-ACK information may include a NACK indicating the UE failed to receive the one or more PDSCHs. In instances where the UE misses a DCI, the UE may automatically include NACK information for both the DCI and for any PDSCH(s) that the UE may have missed due to its failure to receive the DCI.

In some examples, the processor may execute instructions for combining (e.g., concatenating or appending) the DCI-ACK information and the SCH-ACK information into a single HARQ-ACK message. The processor may format the HARQ-ACK message according to a semi-static HARQ-ACK codebook format stored in memory of the processor. In another example, the processor may format the HARQ-ACK message according to a dynamic HARQ-ACK codebook format stored in memory of the processor. In some examples, the processor may format the HARQ-ACK message according to a dynamic HARQ-ACK codebook format based on configuration information received from the BS.

At block 1208, the processor may determine whether the DCI indicates a UE dormancy behavior for at least one secondary cell (SCell) (e.g., the SDI 535). In an example, the DCI may include a secondary cell dormancy indication (SDI) (e.g., the SDI 535) to indicate a UE dormancy behavior that the UE is to adopt (e.g., adhere to, conform to, exhibit, follow, etc.) for communicating with the at least one SCell. The UE behavior may include a desired activity mode, such as that of a UE dormancy behavior (e.g., setting an RRC corresponding to the SCell to idle) or a UE non-dormancy behavior (e.g., setting an RRC corresponding to the SCell to a connected or powered-on RRC for the SCell).

In instances where the DCI message does not include an SDI indicating a UE dormancy behavior of the SCell (NO at block 1208), the processor may proceed to block 1212.

In instances where the DCI message includes an SDI indicating a dormancy behavior for the UE to utilize for communicating with the at least one SCell (YES at block 1208), the processor may optionally proceed to either block 1210A or block 1210B.

At block 1210A, when the UE behavior indicates a dormancy behavior for the SCell, the processor may determine that the communication circuitry is configured to communicate via the SCell in an active mode and as such, may then place the circuitry in the dormant mode using the power control circuitry (e.g., the power control circuitry 1042). That is, an activated SCell may be in a dormant mode and from there the activated SCell may then be placed in a non-dormant (e.g., active) mode. Likewise, an activated SCell may be in an active mode and from there the activated SCell may be switched to a dormant mode according to the SDI. In either case, the power control circuitry 1042 may provide various levels of power depending on which of the activated SCells are dormant and which are non-dormant at any given time.

In some examples, the power control circuitry 1042 may provide a first level of power where a particular SCell is non-dormant, such that the UE may exhibit the appropriate UE behavior with respect to that SCell. In an example, the UE may utilize a particular amount of power when monitoring the SCell for a downlink transmission, such as a PDCCH transmission. When the particular SCell is set to dormant, on the other hand, the power control circuitry 1042 may provide a second, lower power level with respect to the particular SCell that is lower than the first power level. This is because the indicated UE behavior may cause a reduction in UE activity on that particular SCell (e.g., no PDCCH monitoring, no PDSCH reception, reduced CSI/measurement and reporting frequency, etc.), and hence may allow the UE to utilize less power relative to that SCell.

At block 1210B, when the SDI indicates the UE behavior as including a non-dormancy behavior (e.g., an active mode) for the SCell, the processor may determine that communication circuitry of the processor is configured to communicate via the SCell in the dormant mode and place the communication circuitry in the active mode using the power control circuitry (e.g., the power control circuitry 1042).

At block 1212, the processor may determine whether a physical downlink shared channel (PDSCH) scheduled by the DCI has been successfully received via the PCell. In some examples, the processor may do so by comparing a calculated cyclic redundancy check (CRC) for PDSCH data received via the communication circuitry with a CRC received in association with the PDSCH.

In instances where the UE 106 fails to successfully receive (e.g., correctly decode) the PDSCH from the network (NO at block 1212), the processor may proceed to block 1214.

In instances where the UE 106 successfully receives the PDSCH (YES at block 1212), the processor may proceed to block 1216.

At block 1214, the processor may use the communication circuitry to transmit HARQ-ACK information to the BS indicating that a PDSCH was not successfully received. In an example, the processor may execute instructions for combining the DCI-ACK information and the SCH-ACK information into a single HARQ-ACK message. In some examples, the UE 106 may format the HARQ-ACK message according to a semi-static HARQ-ACK codebook format stored in memory of the processor. In another example, the UE 106 may utilize a dynamic codebook format based on information received from the BS.

At block 1216, the processor may use the communication circuitry to transmit the HARQ-ACK message to the BS. In such examples, the HARQ-ACK message may include one or more bits (e.g., one or more DCI-ACK information bits) indicating that the UE 106 successfully received the DCI. In addition, the HARQ-ACK message may include one or more bits (e.g., one or more SCH-ACK information bits) indicating that the UE 106 successfully received (e.g., decoded correctly) the one or more PDSCH data items the corresponding DCI scheduled for the UE 106.

Further Examples Having a Variety of Features

The disclosure may be further understood by way of the following examples:

Example 1: A method of wireless communication, including: receiving, via a primary cell (PCell), a first downlink control information (DCI) message, the first DCI message including a secondary cell dormancy indication (SDI) that indicates a user equipment (UE) behavior corresponding to one or more secondary cells (SCells); transmitting, via the PCell, first DCI-acknowledgment (DCI-ACK) information acknowledging reception of at least the first DCI message; and utilizing, in accordance with the UE behavior, the one or more SCells and the PCell to receive a set of downlink (DL) transmissions subsequent to the transmitting of the first DCI-ACK information.

Example 2: A method according to Example 1, further comprising: determining scheduling data corresponding to a physical downlink shared channel (PDSCH); receiving, via the PCell, the PDSCH; and transmitting shared-channel-acknowledgement (SCH-ACK) information corresponding to the PDSCH.

Example 3: A method of any one or more of Examples 1 or 2, wherein the transmitting of the first DCI-ACK information comprises: transmitting hybrid automatic repeat request acknowledgment (HARQ-ACK) information, the HARQ-ACK information including: the first DCI-ACK information, and the shared-channel-acknowledgement (SCH-ACK) information.

Example 4: A method of Example 3, wherein the SCH-ACK information is generated via a first HARQ-ACK codebook, and wherein the first DCI-ACK information is generated via the first HARQ-ACK codebook, wherein the first HARQ-ACK codebook comprises a dynamic codebook.

Example 5: A method according to any one or more of Examples 2 through 4, wherein the transmitting of the SCH-ACK information comprises: generating the SCH-ACK information to include a negative acknowledgment (NACK) indicating a failure to successfully receive the PDSCH; and transmitting, via the PCell, the HARQ-ACK information to include the NACK.

Example 6: A method according to any one or more of Examples 1 through 5, wherein the subsequent communication comprises one or more downlink (DL) transmissions, the method further comprising: transitioning the one or more SCells in accordance with the SDI, wherein the UE is configured to adjust a first power level corresponding to the one or more SCells to at least one second power level; receiving the one or more DL transmissions via the one or more SCells; and transmitting a physical uplink control channel (PUCCH) via the PCell, the PUCCH corresponding to the one or more DL transmissions received via the one or more SCells.

Example 7: A method according to Example 6, wherein the at least one second power level comprises at least one power level greater than the first component power level, wherein the transmitting of the PUCCH comprises: transmitting, via an uplink (UL) slot, the PUCCH using the at least one second power level, wherein the PUCCH includes shared-channel-acknowledgement (SCH-ACK) information relative to a plurality of data items, the plurality of data items including: a first set of data items received via the PCell; and a second set of data items received via the one or more SCells.

Example 8: A method according to any one or more of Examples 1 through 7, further comprising: receiving one or more downlink assignment index (DAI) values corresponding to at least the first DCI message; receiving a set of additional DCI messages distinct and separate from the first DCI message; receiving additional DAI values corresponding to each additional DCI message of the set of additional DCI messages, the additional DAI values comprising a set of counter DAI values and a set of total DAI values; and transmitting, via the PCell, additional DCI-ACK information indicating a failure to receive one or more of the additional DCI messages of the set of additional DCI messages when the additional DAI values represent a discrepancy in at least one of: the set of counter DAI values, or the set of total DAI values.

Example 9: A method according to any one or more of Examples 1 through 8, wherein the first DCI message is received during a first time interval specified via a HARQ-ACK codebook, the method further comprising: receiving a first set of additional DCI messages during the first time interval, wherein the first DCI message and the additional DCI messages include the SDI indicating the UE behavior corresponding to the one or more SCells; and generating the first DCI-ACK information acknowledging reception of at least one of: the first DCI message, or any one or more of the additional DCI messages.

Example 10: A method according to any one or more of Examples 1 through 9, wherein the transmitting of the first DCI-ACK information acknowledging reception of at least the first DCI message further comprises: receiving a plurality of DCI messages via the PCell during a plurality of time intervals, the plurality of time intervals specified via a semi-static HARQ-ACK codebook, wherein the plurality of DCI messages includes the first DCI message; and transmitting the first DCI-ACK information acknowledging reception of the plurality of DCI messages.

Example 11: A wireless communication device comprising: a processor; a transceiver communicatively coupled to the processor; and a memory communicatively coupled to the processor, wherein the processor and the memory are configured to: receive, via a primary cell (PCell), a first downlink control information (DCI) message including a secondary cell dormancy indication (SDI), the SDI indicating a user equipment (UE) behavior corresponding to a secondary cell (SCell); transmit, via the PCell, first DCI-acknowledgment (DCI-ACK) information comprising one or more bits indicating whether the wireless communication device successfully received the first DCI message; and utilize, in accordance with the UE behavior, the SCell and the PCell to receive a set of downlink (DL) transmissions subsequent to the transmitting of the first DCI-ACK information.

Example 12: A wireless communication device according to Example 11, wherein the processor and the memory are further configured to: determine, via the DCI message, scheduling data corresponding to a physical downlink shared channel (PDSCH); receive, via the PCell, the PDSCH; and transmit shared-channel-acknowledgement (SCH-ACK) information corresponding to the PDSCH.

Example 13: A wireless communication device according to any one or more of
Examples 11 or 12, wherein to transmit the first DCI-ACK information, the processor and the memory are configured to: transmit hybrid automatic repeat request acknowledgment (HARQ-ACK) information, the HARQ-ACK information including: the first DCI-ACK information, and the shared-channel-acknowledgement (SCH-ACK) information.

Example 14: A wireless communication device according to Example 13, wherein the SCH-ACK information is generated via a first HARQ-ACK codebook, and wherein the first DCI-ACK information is generated via the first HARQ-ACK codebook.

Example 15: A wireless communication device according to any one or more of Examples 12 through 14, wherein to transmit the SCH-ACK information, the processor and the memory are configured to: generate the SCH-ACK information to include a negative acknowledgment (NACK) indicating a failure to successfully receive the PDSCH; and transmit, via the PCell, the HARQ-ACK information to include the NACK.

Example 16: A wireless communication device according to any one or more of Examples 11 through 15, wherein to utilize the SCell and the PCell to receive the set of downlink (DL) transmissions, the processor and the memory are configured to: initiate monitoring the SCell for physical downlink control channel (PDCCH) transmissions; and continue monitoring the PCell for physical downlink control channel (PDCCH) transmissions.

Example 17: A wireless communication device according to any one or more of Examples 11 through 16, wherein the processor and the memory are further configured to: receive one or more downlink assignment index (DAI) values corresponding to at least the first DCI message; receive a set of additional DCI messages distinct and separate from the first DCI message; receive additional DAI values corresponding to each additional DCI message of the set of additional DCI messages, the additional DAI values comprising a set of counter DAI values and a set of total DAI values; and transmit, via the PCell, additional DCI-ACK information indicating a failure to receive one or more of the additional DCI messages of the set of additional DCI messages when the additional DAI values represent a discrepancy.

Example 18: A wireless communication device according to any one or more of Examples 11 through 17, wherein to transmit the first DCI-ACK information, the processor and the memory are configured to: receive a plurality of DCI messages via the PCell during a plurality of time intervals, the plurality of time intervals specified via a semi-static HARQ-ACK codebook, wherein the plurality of DCI messages includes the first DCI message; and transmit the first DCI-ACK information acknowledging reception of the plurality of DCI messages.

Example 19: A method of wireless communication, including: transmitting, by a scheduling entity via a primary cell (PCell), a first downlink control information (DCI) message including a secondary cell dormancy indication (SDI), the SDI indicating a desired activity mode of a secondary cell (S Cell); receiving, from a scheduled entity via the PCell, first DCI-acknowledgment (DCI-ACK) information that includes one or more bits indicating whether the first DCI message was successfully received by the scheduled entity; and communicating with the scheduled entity via the SCell according to the desired activity mode.

Example 20: A method according to Example 19, further including: transmitting, via the PCell, a physical downlink shared channel (PDSCH) scheduled by the first DCI message; and receiving, via the PCell, hybrid automatic repeat request acknowledgment (HARQ-ACK) information that includes the first DCI-ACK information and shared-channel-acknowledgement (SCH-ACK) information indicating whether the scheduled entity successfully received the PDSCH.

Example 21: A method according to any one or more of Examples 19 or 20, further comprising: receiving, by the scheduling entity, the first DCI-ACK information together with the SCH-ACK information in a single HARQ-ACK message; and determining that the SCH-ACK information indicates that the PDSCH was not successfully received.

Example 22: A method according to any one or more of Examples 19 through 21, further comprising: causing the SDI to indicate an active mode of the SCell; receiving the first DCI-ACK information; determining that the first DCI-ACK information indicates that the first DCI message was received successfully; and transitioning communication with the scheduled entity via the SCell from a dormant mode to the active mode.

Example 23: A method according to any one or more of Examples 19 through 22, further comprising: transmitting a set of additional DCI messages, each additional DCI message including the SDI; receiving, by the scheduling entity, the first DCI-ACK information from the scheduled entity; determining, using the first DCI-ACK information, that one or more of the first DCI message and the additional DCI messages were received successfully; and transitioning communication with the scheduled entity via the SCell to the desired activity mode indicated by the SDI in response to said determining that one or more of the first DCI and the additional DCI messages were received successfully.

Example 24: A method according to any one or more of Examples 19 through 23, further comprising: receiving, by the scheduling entity, DCI-ACK information indicating whether a DCI message was successfully received via the PCell during for each of a set of time intervals specified by a semi-static HARQ-ACK codebook.

Example 25: A method according to any one or more of Examples 19 through 24, further comprising: transmitting, by the scheduling entity, one or more downlink assignment index (DAI) values corresponding to the first DCI message, the one or more DAI values configured to allow the scheduled entity to uniquely identify the first DCI message within a first time interval.

Example 26: A wireless communication device, comprising: a processor; a transceiver communicatively coupled to the processor; and a memory communicatively coupled to the processor, wherein the processor and the memory are configured to: transmit, to a scheduled entity via a primary cell (PCell), a first downlink control information (DCI) message including a secondary cell dormancy indication (SDI), the SDI indicating an activity mode corresponding to a secondary cell (SCell); receive, from the scheduled entity via the PCell, first DCI-acknowledgment (DCI-ACK) information that includes one or more bits indicating whether the scheduled entity successfully received the first DCI message; and communicate with the scheduled entity via the SCell according to the desired activity mode.

Example 27: A wireless communication device according to Example 26, wherein the processor and the memory are further configured to: transmit, via the PCell, a physical downlink shared channel (PDSCH) scheduled by the first DCI message; and receive, from the scheduled entity via the PCell, hybrid automatic repeat request acknowledgement (HARQ-ACK) information, the HARQ-ACK information including: the first DCI-ACK information, and shared-channel-acknowledgement (SCH-ACK) information, the SCH-ACK information indicating whether the scheduled entity successfully received the PDSCH.

Example 28: A wireless communication device according to any one or more of

Examples 26 or 27, wherein the processor and the memory are further configured to: receive the first DCI-ACK information together with the SCH-ACK information in a single HARQ-ACK message; and determine that the SCH-ACK information indicates that the PDSCH was not successfully received.

Example 29: A wireless communication device according to any one or more of

Examples 26 through 28, wherein the processor and the memory are further configured to: cause the SDI to indicate an active mode of the SCell; receive the first DCI-ACK information; determine that the first DCI-ACK information indicates that the first DCI message was received successfully; and transition communication with the scheduled entity via the SCell from a dormant mode to an active mode.

Example 30: A wireless communication device according to any one or more of

Examples 26 through 29, wherein the processor and the memory are further configured to: transmit, to the scheduled entity, a set of additional DCI messages, each additional DCI message including the SDI; receive the first DCI-ACK information from the scheduled entity; determine, using the first DCI-ACK information, that one or more of: the first DCI message, and the additional DCI messages, were received successfully; and transition communication with the scheduled entity via the SCell to the desired activity mode indicated by the SDI.

Example 31: A method, apparatus, and non-transitory computer-readable medium for of wireless communication includes receiving, by a scheduled entity via a primary cell (PCell) from a scheduling entity, a first downlink control information (DCI) message including a secondary cell dormancy indication (SDI), the SDI indicating a UE behavior (e.g., a desired activity mode) for the scheduled entity to adopt (e.g., adhere to) for communicating with a secondary cell (SCell); transmitting, from the scheduled entity to the scheduling entity via the PCell, first DCI-acknowledgment (DCI-ACK) information that includes one or more bits indicating whether the first DCI message was successfully received by the scheduled entity; and configuring the scheduled entity to communicate with the SCell according to the UE behavior (e.g., the desired activity mode).

Example 32: A method, apparatus, and non-transitory computer-readable medium of Example 31, further including receiving, by the scheduled entity, a physical downlink shared channel (PDSCH) scheduled by the first DCI message from the scheduling entity via the PCell. Example 32 also includes transmitting, by the scheduled entity to the scheduling entity via the PCell, hybrid automatic repeat request acknowledgment (HARQ-ACK) information that includes the first DCI-ACK information and shared-channel-acknowledgement (SCH-ACK) information indicating whether the PDSCH was successfully received by the scheduled entity.

Example 33: A method, apparatus, and non-transitory computer-readable medium of any of Examples 31-32, further including determining, by the scheduled entity, that the SDI indicates an active mode of the SCell with respect to the scheduled entity. Example 33 also includes generating the first DCI-ACK information to indicate that the first DCI message was received successfully. Example 33 further includes transitioning the scheduled entity from a dormant mode with respect to the SCell from to an active mode with respect to the SCell in response to determining that the SDI indicates an active mode of the SCell with respect to the scheduled entity.

Example 34: A method, apparatus, and non-transitory computer-readable medium of any of Examples 31-33, further including determining, by the scheduled entity that the PDSCH was not successfully received. Example 34 also includes generating the SCH-ACK information to indicate that the PDSCH was not successfully received; Example 34 further includes transmitting the first DCI-ACK information together with the SCH-ACK information in a single HARQ-ACK message.

Example 35: A method, apparatus, and non-transitory computer-readable medium of any of Examples 31-34, further including receiving, by the scheduled entity, a set of additional DCI messages. Example 35 also includes receiving, by the scheduled entity, one or more downlink assignment index (DAI) values corresponding to the first DCI message and additional DAI values corresponding to each DCI message of the set of additional DCI messages. Example 35 further includes determining, using the additional DAI values, that one or more DCI messages of the set of additional DCI messages was not successfully received. Example 35 still further includes transmitting, by the scheduled entity, additional DCI-ACK information indicating that the one or more DCI messages of the set of additional DCI messages was not successfully received.

Example 36: A method, apparatus, and non-transitory computer-readable medium of any of Examples 31-35, further including receiving, by the scheduled entity, the first DCI message and a first set of additional DCI messages during a first time interval. Each of the additional DCI messages includes the SDI. Example 36 also includes determining either that: the first DCI message was not received successfully and none of the additional DCI messages were received successfully, or the first DCI message was received successfully. Example 36 further includes transmitting first DCI-ACK information to indicate whether, during the first time interval, at least one DCI message was successfully received.

Example 37: A method, apparatus, and non-transitory computer-readable medium of any of Examples 31-36, further including transmitting DCI-ACK information indicating whether a DCI message was successfully received via the PCell during each of a set of time intervals specified by a semi-static HARQ-ACK codebook.

Example 38: A method, apparatus, and non-transitory computer-readable medium for of wireless communication includes transmitting, by a scheduling entity to a scheduled entity via a primary cell (PCell), a first downlink control information (DCI) message (e.g., a DCI message carried on a particular physical downlink control channel (PDCCH) via the PCell). The first DCI message includes a secondary cell dormancy indication (SDI). The SDI indicates a UE behavior (e.g., a desired activity mode) for the UE to adopt (e.g., adhere to) relative to one or more secondary cells (SCells) as indicated. Example 8 also includes receiving, by the scheduling entity from the scheduled entity via the primary cell (PCell), first DCI-acknowledgment (DCI-ACK) information. The first DCI-ACK information includes one or more bits indicating whether the first DCI message was successfully received by the scheduled entity. Example 38 further includes communicating with the scheduled entity via the SCell according to the UE behavior (e.g., the desired activity mode).

Example 39: A method, apparatus, and non-transitory computer-readable medium of Example 38 further including transmitting, by a scheduling entity to a scheduled entity via a primary cell (PCell), a first downlink control information (DCI) message. The first DCI message includes a secondary cell dormancy indication (SDI). The SDI indicates a UE behavior (e.g., a desired activity mode) of a secondary cell (SCell) with respect to the scheduled entity. Example 39 also includes receiving, by the scheduling entity from the scheduled entity via the PCell, first DCI-acknowledgment (DCI-ACK) information that includes one or more bits indicating whether the first DCI message was successfully received by the scheduled entity. Example 39 further includes communicating with the scheduled entity via the SCell according to the UE behavior (e.g., the desired activity mode).

Example 40: A method, apparatus, and non-transitory computer-readable medium of any of Examples 38-39 further including transmitting, by the scheduling entity, a physical downlink shared channel (PDSCH) scheduled by the first DCI message to the scheduled entity via the PCell. Example 40 also includes receiving, by the scheduling entity from the scheduled entity via the PCell, HARQ-ACK information. The HARQ-ACK information includes: the first DCI-ACK information, and shared-channel-acknowledgement (SCH-ACK) information, the SCH-ACK information indicating whether the PDSCH was successfully received by the scheduled entity.

Example 41: A method, apparatus, and non-transitory computer-readable medium of any of Examples 38-40, further including receiving, by the scheduling entity via the PCell, DCI-ACK information indicating whether a DCI message was successfully received via the PCell relative to a set of time intervals specified by a semi-static HARQ-ACK codebook.

Example 42: A method, apparatus, and non-transitory computer-readable medium of Examples 38-41, further including transmitting to the scheduled entity, by the scheduling entity, a set of additional DCI messages. Each additional DCI includes the SDI. Example 42 also includes receiving, by the scheduling entity, the first DCI-ACK information from the scheduled entity. Example 42 further includes determining, using the first DCI-ACK information, that one or more of: the first DCI message, and the additional DCI messages, were received successfully. Example 42 still further includes transitioning communication with the scheduled entity via the SCell to the UE behavior (e.g., a desired activity mode) indicated by the SDI in response to said determining that one or more of the first DCI message and the additional DCI messages were received successfully.

Example 43: A method, apparatus, and non-transitory computer-readable medium of any of Examples 38-42, further including receiving, by the scheduling entity, DCI-ACK information indicating whether a DCI message was successfully received via the PCell during for each of a set of time intervals specified by a semi-static HARQ-ACK codebook.

Example 44: A method, apparatus, and non-transitory computer-readable medium of any of Examples 38-43, further including transmitting, by the scheduling entity to the scheduled entity, one or more downlink assignment index (DAI) values. The one or more DAI values correspond to the first DCI message and uniquely identify the first DCI message within a first time interval to the scheduled entity.

This disclosure presents several aspects of a wireless communication network with reference to an exemplary implementation. The actual telecommunication standard, network architecture, and/or communication standard employed will depend on the specific application and the overall design constraints imposed on the system. NR is an emerging wireless communications technology under development. As those skilled in the art will readily appreciate, various aspects described throughout this disclosure may be extended to other telecommunication systems, network architectures and communication standards.

By way of example, the various aspects of this disclosure may be implemented within systems defined by, and/or described in documents from, an organization named "3rd Generation Partnership Project" (3GPP), such as Long-Term Evolution (LTE), as well as others including the Evolved Packet System (EPS), and/or the Universal Mobile Telecommunication System (UMTS), and/or the Global System for Mobile (GSM). Various aspects may also be extended to systems defined by, and/or described in documents from, an organization named the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. It should be noted that the terms "network" and "system" are often used interchangeably.

In some examples, a CDMA network may implement a radio technology such as Universal Terrestrial Radio Access (UTRA), which includes Wideband CDMA (WCDMA) as well as other variants. A TDMA network may implement a radio technology such as Global System for Mobile Communications (GSM). An OFDMA network may implement a radio technology such as NR (e.g., 5G NR), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A, UMB, and GSM are described in 3GPP documents.

The present disclosure uses the word "exemplary" to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation.

The present disclosure uses the term "coupled" to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The present disclosure uses the terms "circuit" and "circuitry" broadly, to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-12 may be rearranged and/or combined into a single component, step, feature or function or embodied in several components, steps, or functions. Additional elements, components, steps, and/or functions may also be added without departing from novel features disclosed herein. The apparatus, devices, and/or components

What is claimed is:

1. A method of wireless communication at a wireless communication device, comprising:
   receiving, via a primary cell (PCell), a first downlink control information (DCI) message, the first DCI message including a secondary cell dormancy indication (SDI) that indicates a user equipment (UE) behavior corresponding to one or more secondary cells (SCells), wherein the reception comprises receiving a plurality of DCI messages via the PCell during a plurality of time intervals, the plurality of time intervals being specified via a semi-static HARQ-ACK codebook, wherein the plurality of DCI messages includes the first DCI message;
   transmitting, via the PCell, first DCI-acknowledgment (DCI-ACK) information acknowledging reception of at least the first DCI message, wherein the first DCI-ACK information acknowledges reception of the plurality of DCI messages; and
   using, in accordance with the UE behavior, the one or more SCells and the PCell to receive a set of downlink (DL) transmissions subsequent to the transmitting of the first DCI-ACK information.

2. The method of claim 1, further comprising:
   determining scheduling data corresponding to a physical downlink shared channel (PDSCH);
   receiving, via the PCell, the PDSCH; and
   transmitting shared-channel-acknowledgement (SCH-ACK) information corresponding to the PDSCH.

3. The method of claim 2, wherein the transmitting of the first DCI-ACK information comprises:
   transmitting hybrid automatic repeat request acknowledgment (HARQ-ACK) information, the HARQ-ACK information including:
   the first DCI-ACK information, and
   the shared-channel-acknowledgement (SCH-ACK) information.

4. The method of claim 3, wherein the SCH-ACK information is generated via a first HARQ-ACK codebook, and wherein the first DCI-ACK information is generated via the first HARQ-ACK codebook, wherein the first HARQ-ACK codebook comprises a dynamic codebook.

5. The method of claim 2, wherein the transmitting of the SCH-ACK information comprises:
   generating the SCH-ACK information to include a negative acknowledgment (NACK) indicating a failure to successfully receive the PDSCH; and
   transmitting, via the PCell, the HARQ-ACK information to include the NACK.

6. The method of claim 1, wherein the subsequent communication comprises one or more downlink (DL) transmissions, the method further comprising:
- transitioning the one or more SCells in accordance with the SDI, wherein the UE is configured to adjust a first power level corresponding to the one or more SCells to at least one second power level;
- receiving the one or more DL transmissions via the one or more SCells; and
- transmitting a physical uplink control channel (PUCCH) via the PCell, the PUCCH corresponding to the one or more DL transmissions received via the one or more SCells.

7. The method of claim 6, wherein the at least one second power level comprises at least one power level greater than the first power level, wherein the transmitting of the PUCCH comprises:
- transmitting, via an uplink (UL) slot, the PUCCH using the at least one second power level, wherein the PUCCH includes shared-channel-acknowledgement (SCH-ACK) information relative to a plurality of data items, the plurality of data items including:
  - a first set of data items received via the PCell; and
  - a second set of data items received via the one or more SCells.

8. The method of claim 1, further comprising:
- receiving one or more downlink assignment index (DAI) values corresponding to at least the first DCI message;
- receiving a set of additional DCI messages distinct and separate from the first DCI message;
- receiving additional DAI values corresponding to each additional DCI message of the set of additional DCI messages, the additional DAI values comprising a set of counter DAI values and a set of total DAI values; and
- transmitting, via the PCell, additional DCI-ACK information indicating a failure to receive one or more of the additional DCI messages of the set of additional DCI messages when the additional DAI values represent a discrepancy in at least one of:
  - the set of counter DAI values, or
  - the set of total DAI values.

9. The method of claim 1, wherein the first DCI message is received during a first time interval specified via a HARQ-ACK codebook, the method further comprising:
- receiving a first set of additional DCI messages during the first time interval, wherein the first DCI message and the additional DCI messages include the SDI indicating the UE behavior corresponding to the one or more SCells; and
- generating the first DCI-ACK information acknowledging reception of at least one of:
  - the first DCI message, or
  - any one or more of the additional DCI messages.

10. A method of wireless communication at a scheduling entity, comprising:
- transmitting, via a primary cell (PCell), a first downlink control information (DCI) message including a secondary cell dormancy indication (SDI), the SDI indicating a desired activity mode of a secondary cell (SCell);
- receiving, from a scheduled entity via the PCell, first DCI-acknowledgment (DCI-ACK) information that includes one or more bits indicating whether the first DCI message was successfully received by the scheduled entity;
- communicating with the scheduled entity via the SCell according to the desired activity mode;
- transmitting a set of additional DCI messages, each additional DCI message including the SDI;
- receiving the first DCI-ACK information from the scheduled entity;
- determining, using the first DCI-ACK information, that one or more of the first DCI message and the additional DCI messages were received successfully; and
- transitioning communication with the scheduled entity via the SCell to the desired activity mode indicated by the SDI in response to said determining that one or more of the first DCI and the additional DCI messages were received successfully.

11. The method of claim 10, further comprising:
- transmitting, via the PCell, a physical downlink shared channel (PDSCH) scheduled by the first DCI message; and
- receiving, via the PCell, hybrid automatic repeat request acknowledgment (HARQ-ACK) information that includes the first DCI-ACK information and shared-channel-acknowledgement (SCH-ACK) information indicating whether the scheduled entity successfully received the PDSCH.

12. The method of claim 11, further comprising:
- receiving, by the scheduling entity, the first DCI-ACK information together with the SCH-ACK information in a single HARQ-ACK message; and
- determining that the SCH-ACK information indicates that the PDSCH was not successfully received.

13. The method of claim 10, further comprising:
- causing the SDI to indicate an active mode of the SCell;
- receiving the first DCI-ACK information;
- determining that the first DCI-ACK information indicates that the first DCI message was received successfully; and
- transitioning communication with the scheduled entity via the SCell from a dormant mode to the active mode.

14. The method of claim 10, further comprising:
- receiving, by the scheduling entity, DCI-ACK information indicating whether a DCI message was successfully received via the PCell during for each of a set of time intervals specified by a semi-static HARQ-ACK codebook.

15. The method of claim 10, further comprising:
- transmitting, by the scheduling entity, one or more downlink assignment index (DAI) values corresponding to the first DCI message, the one or more DAI values configured to allow the scheduled entity to uniquely identify the first DCI message within a first time interval.

16. A method of wireless communication at a wireless communication device, comprising:
- receiving, via a primary cell (PCell), a first downlink control information (DCI) message, the first DCI message including a secondary cell dormancy indication (SDI) that indicates a user equipment (UE) behavior corresponding to one or more secondary cells (SCells);
- transmitting, via the PCell, first DCI-acknowledgment (DCI-ACK) information acknowledging reception of at least the first DCI message;
- using, in accordance with the UE behavior, the one or more SCells and the PCell to receive a set of downlink (DL) transmissions subsequent to the transmitting of the first DCI-ACK information;
- receiving one or more downlink assignment index (DAI) values corresponding to at least the first DCI message;
- receiving a set of additional DCI messages distinct and separate from the first DCI message;

receiving additional DAI values corresponding to each additional DCI message of the set of additional DCI messages, the additional DAI values comprising a set of counter DAI values and a set of total DAI values; and transmitting, via the PCell, additional DCI-ACK information indicating a failure to receive one or more of the additional DCI messages of the set of additional DCI messages when the additional DAI values represent a discrepancy in at least one of:
the set of counter DAI values, or
the set of total DAI values.

17. The method of claim 16, further comprising:
determining scheduling data corresponding to a physical downlink shared channel (PDSCH);
receiving, via the PCell, the PDSCH; and
transmitting shared-channel-acknowledgement (SCH-ACK) information corresponding to the PDSCH.

18. The method of claim 17, wherein the transmitting of the first DCI-ACK information comprises:
transmitting hybrid automatic repeat request acknowledgment (HARQ-ACK) information, the HARQ-ACK information including:
the first DCI-ACK information, and
the shared-channel-acknowledgement (SCH-ACK) information.

19. The method of claim 18, wherein the SCH-ACK information is generated via a first HARQ-ACK codebook, and wherein the first DCI-ACK information is generated via the first HARQ-ACK codebook, wherein the first HARQ-ACK codebook comprises a dynamic codebook.

20. The method of claim 17, wherein the transmitting of the SCH-ACK information comprises:
generating the SCH-ACK information to include a negative acknowledgment (NACK) indicating a failure to successfully receive the PDSCH; and
transmitting, via the PCell, the HARQ-ACK information to include the NACK.

21. The method of claim 16, wherein the subsequent communication comprises one or more downlink (DL) transmissions, the method further comprising:
transitioning the one or more SCells in accordance with the SDI, wherein the UE is configured to adjust a first power level corresponding to the one or more SCells to at least one second power level;
receiving the one or more DL transmissions via the one or more SCells; and
transmitting a physical uplink control channel (PUCCH) via the PCell, the PUCCH corresponding to the one or more DL transmissions received via the one or more SCells.

22. The method of claim 21, wherein the at least one second power level comprises at least one power level greater than the first component power level, wherein the transmitting of the PUCCH comprises:
transmitting, via an uplink (UL) slot, the PUCCH using the at least one second power level, wherein the PUCCH includes shared-channel-acknowledgement (SCH-ACK) information relative to a plurality of data items, the plurality of data items including:
a first set of data items received via the PCell; and
a second set of data items received via the one or more SCells.

23. A method of wireless communication at a wireless communication device, comprising:
receiving, via a primary cell (PCell), a first downlink control information (DCI) message, the first DCI message including a secondary cell dormancy indication (SDI) that indicates a user equipment (UE) behavior corresponding to one or more secondary cells (SCells), wherein the first DCI message is received during a first time interval specified via a HARQ-ACK codebook;
transmitting, via the PCell, first DCI-acknowledgment (DCI-ACK) information acknowledging reception of at least the first DCI message; and
using, in accordance with the UE behavior, the one or more SCells and the PCell to receive a set of downlink (DL) transmissions subsequent to the transmitting of the first DCI-ACK information;
receiving a first set of additional DCI messages during the first time interval, wherein the first DCI message and the additional DCI messages include the SDI indicating the UE behavior corresponding to the one or more SCells; and
generating the first DCI-ACK information acknowledging reception of at least one of:
the first DCI message, or
any one or more of the additional DCI messages.

24. The method of claim 23, further comprising:
determining scheduling data corresponding to a physical downlink shared channel (PDSCH);
receiving, via the PCell, the PDSCH; and
transmitting shared-channel-acknowledgement (SCH-ACK) information corresponding to the PDSCH.

25. The method of claim 24, wherein the transmitting of the first DCI-ACK information comprises:
transmitting hybrid automatic repeat request acknowledgment (HARQ-ACK) information, the HARQ-ACK information including:
the first DCI-ACK information, and
the shared-channel-acknowledgement (SCH-ACK) information.

26. The method of claim 25, wherein the SCH-ACK information is generated via a first HARQ-ACK codebook, and wherein the first DCI-ACK information is generated via the first HARQ-ACK codebook, wherein the first HARQ-ACK codebook comprises a dynamic codebook.

27. The method of claim 24, wherein the transmitting of the SCH-ACK information comprises:
generating the SCH-ACK information to include a negative acknowledgment (NACK) indicating a failure to successfully receive the PDSCH; and
transmitting, via the PCell, the HARQ-ACK information to include the NACK.

28. The method of claim 23, wherein the subsequent communication comprises one or more downlink (DL) transmissions, the method further comprising:
transitioning the one or more SCells in accordance with the SDI, wherein the UE is configured to adjust a first power level corresponding to the one or more SCells to at least one second power level;
receiving the one or more DL transmissions via the one or more SCells; and
transmitting a physical uplink control channel (PUCCH) via the PCell, the PUCCH corresponding to the one or more DL transmissions received via the one or more SCells.

29. The method of claim 28, wherein the at least one second power level comprises at least one power level greater than the first component power level, wherein the transmitting of the PUCCH comprises:
transmitting, via an uplink (UL) slot, the PUCCH using the at least one second power level, wherein the PUCCH includes shared-channel-acknowledgement (SCH-ACK) information relative to a plurality of data items, the plurality of data items including:
a first set of data items received via the PCell; and
a second set of data items received via the one or more SCells.

* * * * *